United States Patent
Vazquez Castro

(10) Patent No.: US 7,450,602 B2
(45) Date of Patent: Nov. 11, 2008

(54) METHOD AND A DEVICE FOR SCHEDULING AND SENDING DATA PACKETS FROM A COMMON SENDER TO A PLURALITY OF USERS SHARING A COMMON TRANSMISSION CHANNEL

(75) Inventor: Maria Angeles Vazquez Castro, Vigo (ES)

(73) Assignee: Agence Spatiale Europeenne, Paris (FR)

( * ) Notice: Subject to any disclaimer, the term of this patent is extended or adjusted under 35 U.S.C. 154(b) by 574 days.

(21) Appl. No.: 11/254,678

(22) Filed: Oct. 21, 2005

(65) Prior Publication Data

US 2006/0104299 A1  May 18, 2006

(30) Foreign Application Priority Data

Oct. 22, 2004 (FR) .................................. 04 11296

(51) Int. Cl.
*H04L 12/28* (2006.01)
*H04L 12/54* (2006.01)

(52) U.S. Cl. ..................................... 370/412; 370/429

(58) Field of Classification Search ......... 370/412–418, 370/428, 429
See application file for complete search history.

(56) References Cited

U.S. PATENT DOCUMENTS

| 5,625,625 | A | * | 4/1997 | Oskouy et al. ............ 370/395.4 |
| 5,920,568 | A | * | 7/1999 | Kurita et al. ................ 370/412 |
| 6,535,728 | B1 | | 3/2003 | Perfit et al. |
| 6,650,651 | B1 | * | 11/2003 | Meredith et al. ............ 370/412 |
| 7,023,840 | B2 | * | 4/2006 | Golla et al. ................. 370/360 |
| 2002/0110135 | A1 | * | 8/2002 | Oki et al. .................... 370/412 |
| 2003/0108183 | A1 | | 6/2003 | Dhir et al. |
| 2004/0022188 | A1 | * | 2/2004 | Abel et al. .................. 370/229 |
| 2004/0081184 | A1 | * | 4/2004 | Magill et al. ................ 370/413 |
| 2004/0120321 | A1 | * | 6/2004 | Han et al. ................. 370/395.4 |
| 2004/0141504 | A1 | * | 7/2004 | Blanc et al. ................. 370/394 |

FOREIGN PATENT DOCUMENTS

EP  1037398  9/2000

OTHER PUBLICATIONS

Y. Cao et al., "Scheduling Algorithms in Broad-Band Wireless Networks", IEEE Proceedings, vol. 89, No. 1, Jan. 2001, pp. 76-87.

(Continued)

*Primary Examiner*—Hong Sol Cho
(74) *Attorney, Agent, or Firm*—Clark & Brody

(57) ABSTRACT

The invention, which applies to satellite digital communications systems in particular, relates to a device and a method of scheduling and sending data packets with a required level of protection from a common sender to a plurality of users sharing a common transmission channel. The method comprises the steps of:

receiving a stream of input data packets;
  splitting the packets between a plurality of queues;
  extracting the leading packets therefrom using a first scheduling algorithm;
  storing each packet in a particular buffer as a function of the required level of protection; and
  extracting data blocks therefrom using a second scheduling algorithm.

The packets are split between said queues in accordance with a geographical position criterion in respect of the user to whom each packet is addressed.

26 Claims, 11 Drawing Sheets

OTHER PUBLICATIONS

P. Bender et al., "CDMA/HDR: A Bandwidth-Efficient High-Speed Wireless Data Service for Nomadic Users", IEEE Communications Magazine, Jul. 2000, pp. 70-77.

A. Jalali et al., "Data Throughput of CDMA-HDR a High Efficiency-High Data Rate Personal Communication Wireless System", IEEE 51st Vehicular Technology Conference, Tokyo, Japan, May 2000.

X. Liu et al., "Opportunistic Transmission Scheduling with Resource-Sharing Constraints in Wireless Networks", IEEE Journal on Selected Areas in Communications, vol. 19, No. 10, Oct. 2001, pp. 2053-2064.

ETSI Document EN 302 307 V1.1.1, "Digital Video Broadcasting (DVB) Second Generation Framing Structure, Channel Coding and Modulation Systems for Broadcasting, Interactive Services, News Gathering and Other Broadband Satellite Applications", Jan. 2004, pp. 1-72.

R. Rinaldo et al., "DVB-S2 ACM Modes for IP and MPEG Unicast Applications", International Journal of Satellite Communications, No. 22, May 2004, pp. 1-39.

U.C. Fiebig et al. "Review of Propagation Channel Modelling", 2nd Workshop COST 280, The Netherlands, May 26-28, 2003.

O. Fiser, "Propagation Impairment Mitigation for Millimetre Wave Radio Systems: Estimation of the Space Diversity Gain from Rain Rate Measurements", 1st International Workshop COST 280, Jul. 2002, pp. 1-9.

J. Goldhirsh, "Two-Dimension Visualization of Rain Cell Structures", Radio Science, vol. 35, No. 3, May-Jun. 2000, pp. 713-729.

E. Salonen et al., "Fade Slope Analysis for Low Elevation Angle Satellite Links", 2nd Workshop COST 280, ESTEC, May 2003.

* cited by examiner

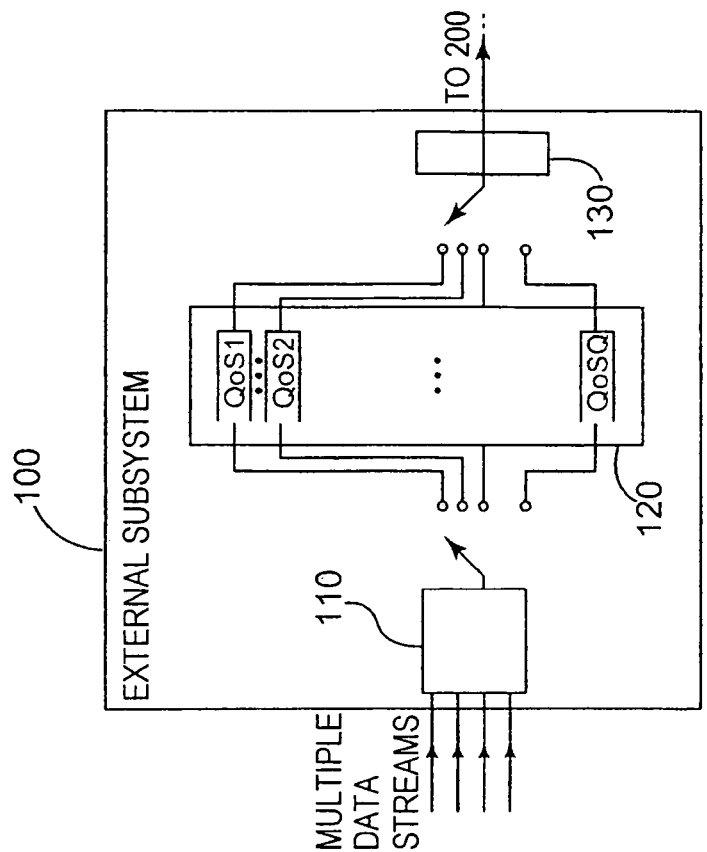
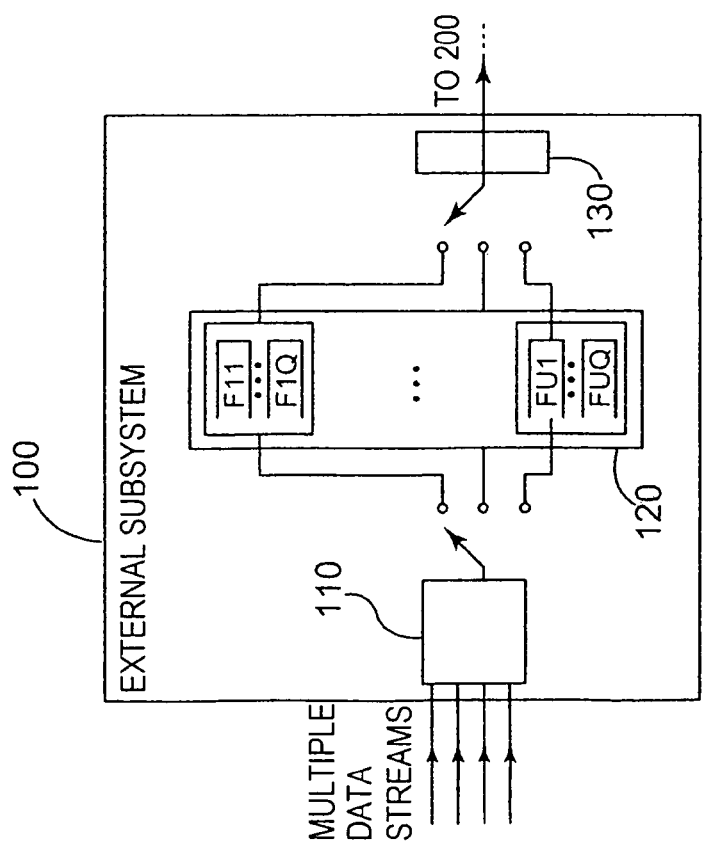

METHOD AND A DEVICE FOR SCHEDULING AND SENDING DATA PACKETS FROM A COMMON SENDER TO A PLURALITY OF USERS SHARING A COMMON TRANSMISSION CHANNEL

The field of the invention is that of communications systems. The invention applies more particularly, but not in any limiting manner, to wireless digital communications systems and even more particularly to packet-switched satellite communications systems.

BACKGROUND OF THE INVENTION

In a communications system including a common sender that has to send data to a plurality of users sharing a common transmission channel, access to the transmission channel may be granted to one user at a time (as in time division multiplex (TDM) systems) or to more than one user at a time (as in code-division multiple access (CDMA) systems). In any event, access to the channel is granted on the basis of certain criteria or scheduling policies. It is important to consider that criteria that enable good performance to be achieved in a cable system may prove unsuited to a wireless system, and vice versa. Among wireless systems, it is also necessary to make a distinction between terrestrial systems and satellite systems, as in these two cases the transmission channel has very different properties.

The paper by Yaxin Cao and V. O. K. Li, "Scheduling algorithms in broadband wireless network", IEEE Proceedings, Vol. 89, No. 1, January 2001, reviews the criteria for managing user access to the common channel in packet-switched terrestrial wireless networks. The objective of such criteria is generally either to optimize the data rate or to achieve equitable access to resources by the various users. The data rate may be maximized simply by granting access at all times to the user who is experiencing the best channel conditions, that is to say the highest signal to noise plus interference ratio (SNIR). This is no particular problem in terrestrial networks because the channel conditions vary very quickly. Equity may be achieved either in terms of access time to the channel or in terms of the quantity of data transmitted. With quantity of data, it is possible for a user who is experiencing poor access conditions (and therefore a low data rate) to monopolize the channel for a long time, to the detriment of other users. A new approach known as "proportional equity" has recently been proposed for combining data rate maximization with some degree of equity between users. On this topic see the following papers:

"CDMA/HDR: A Bandwidth-Efficient High-Speed Wireless Data Service for Nomadic Users", P. Bender, P. Black, M. Grob, R. Padovani, N. Sindhusayana, A. J. Viterbi; IEEE Communications Magazine, Vol. 38, No. 7, pp. 70-77, July 2000, "Data throughput of CDMA-HDR a High Efficiency-High Data Rate Personal Communications Wireless System", A. Jalali, R. Padovani, R. Pankaj, VTC 2000, and "Opportunistic Transmission Scheduling with Resource Sharing Constraints in Wireless Networks", Xin Liu, Edwin K. P. Chong, Ness B. Shroff, IEEE Journal on Selected Areas in Communications, Vol. 19, No. 10, October 2001.

Those techniques prove to be unsuited to satellite communications systems because:

in the case of satellite communications, variations in channel capacity are manifested essentially through intense but sporadic attenuation events that vary slowly and affect a large number of users at the same time, whereas, in contrast, in the case of terrestrial systems, the channel capacity varies quickly and with no correlation between users;

a satellite beam covers a much larger area than a terrestrial system cell;

satellite transmission uses a much wider band than terrestrial transmission (hundreds of Mbps (megabits per second) as against less than 10 Mbps), and a gateway of a satellite communications system must manage a much greater number of packets than its terrestrial counterpart.

The capacity R of a transmission channel, defined as the maximum information data rate that can be transmitted with an arbitrary low error probability, is given by the following equation, in which B is the bandwidth and SNIR is the signal to noise plus interference ratio:

$$R = B \log_2(1+SNIR)$$

Third and fourth generation wireless communications systems routinely use the adaptive coding and modulation (ACM) technique, also known as the adaptive physical layer technique, which consists in modifying the coding and modulation schemes—and therefore the "level of protection" of the data—as a function of the characteristics of the transmission channel. For example, if the SNIR falls, higher channel coding redundancy will be introduced and a lower modulation order (number of bits per symbol transmitted) will be used for transmission, while the symbol data rate remains constant. Accordingly, an acceptable error rate may be maintained despite degraded channel characteristics, at the cost of a reduced information data rate.

Unlike terrestrial systems, satellite communications systems have traditionally been used for broadcasting data. Moreover, conventional systems of this kind are primarily "connection-oriented" (resources are allocated for as long as a query is not blocked), rather than "packet-oriented" like cellular terrestrial systems.

The DVB-S2 standard is a satellite digital communications standard for the Ku (12-14 GHz) and Ka (20-40 GHz) bands, enabling quality of service (QoS) conditions to be satisfied and suited to interactive applications, in particular through the use of the Internet Protocol (IP). It is packet-oriented and encompasses the use of the ACM technology.

The DVB-S2 standard is described in detail in the ETSI document EN 302 307 available from the European Telecommunications Standards Institute (ETSI), 650 Route des Lucioles, F-06921 Sophia Antipolis Cedex, France.

Although the standard as such does not cover scheduling policies, appendix H of the above ETSI document EN 302 307 suggests the possibility of sorting data packets by user, by required service level and/or by protection level (coding and modulation scheme). The first two options are considered in detail in the paper by R. Rinaldo, M. A. Vázquez-Castro, A. Morello, "DVB-S2 ACM modes for IP and MPEG unicast applications", International Journal of Satellite Communications, No. 22, May 2004.

As is demonstrated below, prior art scheduling policies are unsatisfactory. To be more precise, a first policy based on subdivision of data packets by user and by quality of service (QoS) level is excessively complex and a second policy splitting data packets only by user or by quality of service level is unable to guarantee a minimum data rate for each protection layer and/or to achieve isolation between users. These concepts are essential and consequently need to be defined:

The expression "guaranteed minimum data rate" means that each coding and modulation scheme actually in use at a given time—or only certain of said schemes—is assigned one or more predetermined fractions of the total transmission time. This prevents users experiencing poor channel conditions (and thus a high protection level) from monopolizing the system to the detriment of those experiencing better channel conditions (lower protection level), or vice versa.

The term "equity" means that transmission time is assigned 50% to users experiencing good channel conditions and 50% to users experiencing degraded channel conditions. This concept is therefore a special case of the guaranteed minimum data rate concept.

The term "isolation" means that degraded channel conditions for one user do not reduce much, if at all, the data rate for another user who is not experiencing degraded channel conditions.

OBJECTS AND SUMMARY OF THE INVENTION

There is therefore a need for a method and a device of limited complexity for scheduling and sending data packets from a common sender to a plurality of users sharing a common wireless transmission channel capable of guaranteeing a minimum data rate for each protection level and/or equitable access to the transmission channel and/or isolation between users.

The present invention achieves at least one of the objectives stated above.

One aspect of the invention consists in a method of scheduling and sending data packets with a required level of protection from a common sender to a plurality of users sharing a common transmission channel, the method comprising the steps of:

receiving a stream of input data packets;
splitting said packets between a plurality of queues;
extracting the leading packets from said queues using a first scheduling algorithm;
storing each packet in a particular buffer of a set of buffers as a function of the level of protection required when sending it;
extracting data blocks from said buffers using a second scheduling algorithm; and
sending said data blocks with the required level of protection over said common transmission channel; wherein the packets are split between said plurality of queues in accordance with a geographical position criterion in respect of the user to whom each packet is addressed.

In various embodiments:

Said step of splitting said packets between queues in accordance with a geographical position criterion includes identifying geographical areas such that the time series of values of a quantity representing transmission channel conditions for users situated in the same area are correlated with each other on average.

Said step of identifying geographical areas takes into account the spatial distribution of users in order to centre said geographical areas on the highest user density regions so that the limits between areas are in regions of lower user density.

Said step of identifying geographical areas is based on information representing transmission channel conditions.

Each user sends said information representing transmission channel conditions to the common sender via a backward channel.

Said step of identifying geographical areas is repeated periodically.

The level of protection required for sending each data packet is determined as a function of information representing transmission channel conditions sent by each user to the common sender via a backward channel.

Said information representing transmission channel conditions indicates the signal to noise plus interference ratio.

The method also includes coding said data blocks with a coding rate depending on the required level of protection.

The method also includes grouping the bits of said data blocks into symbols with the number of bits per symbol depending on the required level of protection.

The method also includes sending said symbols to said users via said shared transmission channel at a constant symbol data rate.

Said first scheduling algorithm is executed faster than said second scheduling algorithm.

Said first scheduling algorithm is a round-robin scheduling algorithm.

Said second scheduling algorithm is a adaptive weighted round-robin scheduling algorithm with time-out.

Before extracting a data packet from one of said queues, said first scheduling algorithm verifies the state of occupancy of the buffer for which said packet is intended and extracts said packet only if said buffer can store it.

Said common transmission channel is a satellite transmission beam.

The invention also consists in a device for scheduling data packets to be sent with a required level of protection from a common sender to a plurality of users sharing a common transmission channel, the device including:

an input for receiving a stream of data packets to be sent;
a packet classifier for splitting said packets between a plurality of queues;
a set of memory locations for providing a plurality of queues;
a set of buffers;
a first scheduler for extracting leading packets from said queues using a first scheduling algorithm and forwarding them to a particular buffer memory of said set as a function of the level of protection required when sending it; and
a second scheduler for extracting data blocks from said buffers using a second scheduling algorithm; wherein said packet classifier comprises means for splitting the packets between said queues according to a geographical position criterion in respect of the user to whom each packet is addressed.

In various embodiments:

The device further includes an adaptive coding and modulation unit for coding data blocks and grouping coded bits into modulation symbols as a function of said required protection level.

The device further includes an input for receiving information representing transmission channel conditions for each user.

Said input is connected to a backward channel over which each user sends said information representing transmission channel conditions.

The device further includes means for determining the level of protection required for sending each packet on the basis of said information representing transmission channel conditions.

The device further includes means for modifying said geographical criterion on the basis of said information representing transmission channel conditions.

The device further includes means for modifying the scheduling algorithm of the second scheduler according to a signal representing the state of occupancy of the buffers.

The device further includes means for preventing, according to a signal representing the state of occupancy of the buffers, the extraction of a leading packet from one of said queues on behalf of the first scheduler if the buffer to which said packet is addressed does not have sufficient free capacity to store it.

The device further includes means for controlling the speed of operation of the first scheduler and the second scheduler so that the first scheduling algorithm is executed faster than the second scheduling algorithm.

BRIEF DESCRIPTION OF THE DRAWINGS

Other features, details and advantages of the invention will emerge from a reading of the description given with reference to the appended drawings, which are provided by way of example, and in which:

FIGS. 2A and 2B are functional block diagrams of two prior art subsystems external to the DVB-S2 subsystem;

MORE DETAILED DESCRIPTION

Figure 1:
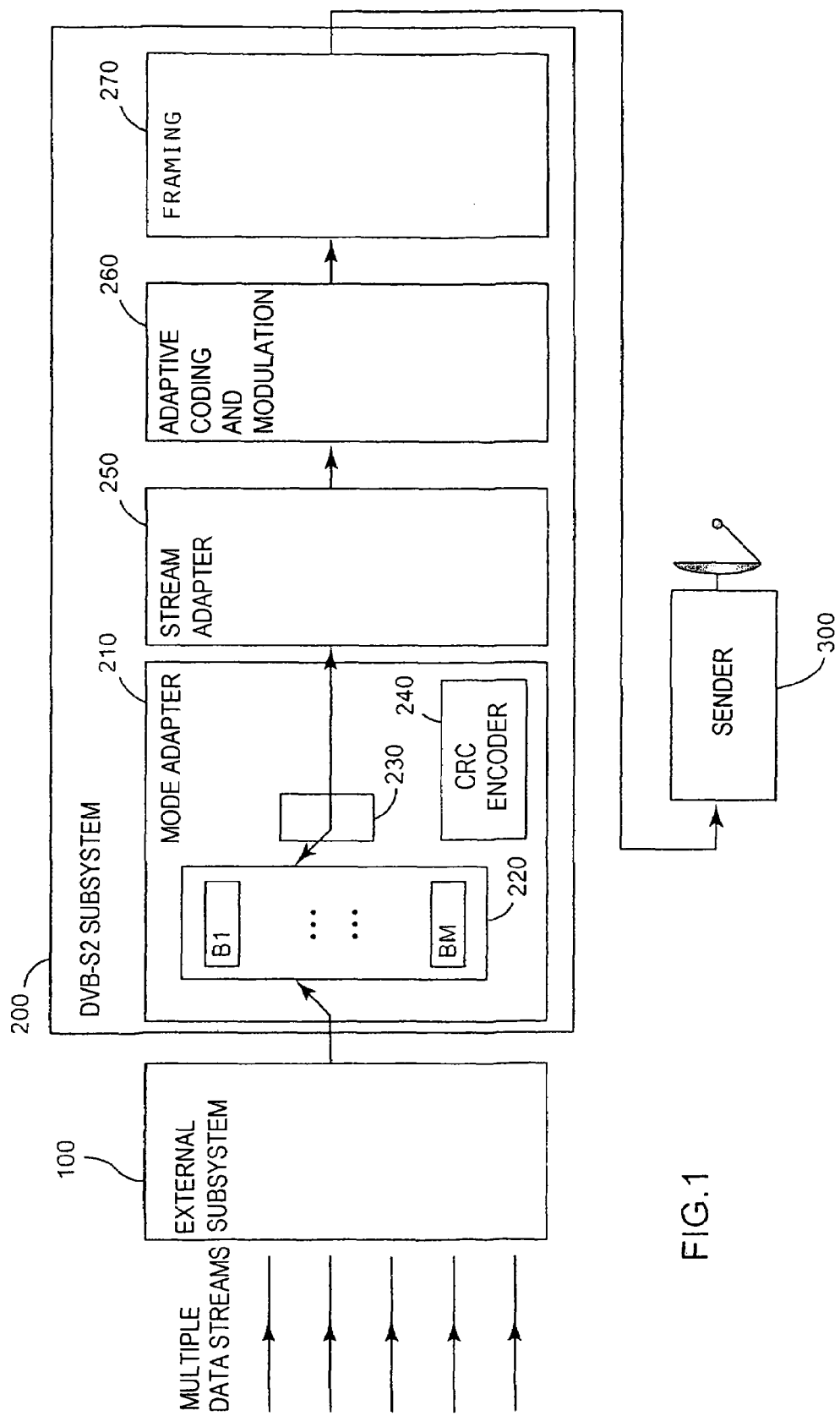
FIG. 1 is a simplified functional block diagram of a DVB-S2 transmission system able to receive at its input multiple streams of data.

FIG. 1 shows, in highly simplified form, a transmission system conforming to the DVB-S2 standard. A system of this kind is capable of receiving at its input multiple streams of data, either generic streams or streams encapsulated in accordance with the MPEG standard. A first stage of scheduling the data is effected by an external subsystem 100, which depends on the specific application and is not defined by the DVB-S2 standard. The data is then forwarded in an order established by said external subsystem 100 to the DVB-S2 subsystem 200, which is made up of the following units: a mode adapter 210, a stream adapter 250, an adaptive coding and modulation unit 260 and a framing unit 270. Finally, the data is forwarded to a sender 300 in order to be sent to users.

The FIG. 1 system may be implemented in a terrestrial transmission station, in which case the satellite is simply a transparent repeater; this is the situation illustrated by FIG. 20 of the paper by R. Rinaldo, M. A. Vazquez-Castro and A. Morelio referred to above. Alternatively, some or all of the above elements may be embarked on the satellite.

The mode adapter 210 includes a set of M buffers B1-BM, where M is the number of protection levels (coding redundancy-modulation order) managed by the system. Data from the external subsystem 100 is stored in the appropriate buffer, as a function of the channel conditions currently being experienced by the user for whom it is intended; this is made possible by information representing the channel conditions received from the users themselves via a backward channel (not shown for simplicity). The content of a buffer is ready to be sent either when said buffer is full or at the end of a particular time-out (TO), which avoids a data packet having to wait too long. The minimum size of a buffer B1-BM is a fixed number $b_m$ of information bits. This number depends on the coding redundancy and the modulation order for the protection level m. In particular, according to the DVB-S2 standard, the number $b_m$ of information bits is from 3072 to 58320.

A scheduler 230 extracts the data from the buffers B1-BM that are full or whose time-out TO has expired and forwards it to the downstream functional units.

The mode adapter 210 also includes a cyclic redundancy check (CRC) encoder which encodes only data packets encapsulated in accordance with the MPEG standard.

The stream adapter 250 scrambles the data to be sent and groups it into frames.

The adaptive coding and modulation unit 260 employs the ACM technique, effecting BCH+LDPC coding with a redundancy that depends on the required protection level, and grouping the coding bits into xPSK (QPSK, 8PSK, 16APSK or 32APSK, etc.) symbols. In this context, the term "modulation" means the association of a symbol with each group of bits, modulation as such of the carrier being effected by the sender 300.

Finally, the functional unit 270 groups the symbols into frames ready to be sent at a constant data rate by the sender 300.

The coded blocks of bits all have the same length L independent of coding redundancy. It follows that the time taken to send a frame depends only on the corresponding modulation order and that its content in terms of information bits depends only the redundancy of the channel coding.

According to the DVB-S2 standard, the length L of a block of coded bits is 16200 or 64800 bits. As most IP packets are shorter than the length L, a plurality of these packets must be concatenated and encoded together.

The paper "DVB-S2 ACM modes for IP and MPEG unicast applications" proposes two particular embodiments of the external subsystem 100 that are shown diagrammatically in FIGS. 2A and 2B, respectively. In both cases, the external subsystem 100 includes in particular the packet classifier 110, a set 120 of queues and a scheduler 130.

In the first embodiment, the packet classifier 110 sorts the data packets at the input as a function of their destination and the quality of service (QoS) level associated with them. To be more precise, the system is considered to be capable of servicing U users and of managing Q different QoS levels; the set 120 of queues is therefore made up of U×Q queues $F_{11}$-$F_{UQ}$, grouped into U blocks of Q queues (one per QoS level), each associated with one user. The data packets sorted by the classifier 110 are stored temporarily in the corresponding queue $F_{11}$-$F_{UQ}$ and extracted in their order of arrival by the scheduler 130. The scheduler works through the U×Q queues using a weighted round-robin (WRR) algorithm and extracts from each non-empty queue the leading packet, i.e. the packet that has been stored therein for the longest time. The WRR algorithm works through the buffers in a predetermined sequence in which each location features an integer number of times; this number is the "weight" of the buffer; the round-robin (RR) algorithm is the special case of this in which all the weights are equal to 1.

The main drawback of an architecture of the above kind is its extreme complexity: the number of users to be serviced can run from a few dozen to thousands, even millions in the near future. This requires a very large number of queues, and thus of memory locations, and a very fast scheduler 130. Indeed, its feasibility appears somewhat uncertain, except in special cases.

Moreover, although dividing data packets by user and by QoS level appears to offer a highly flexible system, the WRR scheduling algorithm, which uses constant weights, limits this flexibility in practice.

The second architecture considered (FIG. 2B) is much less complex, but also less flexible. It is based on dividing data packets by QoS only. Accordingly, the set 120 consists of only Q queues $QoS_1$-$QoS_Q$. As will be demonstrated later, a theoretical model and numerical simulations show that this architecture is incapable of guaranteeing a minimum data rate for each protection level or of achieving isolation between users.

The invention exploits the existence of a correlation between channel conditions for users at geographically close locations. This means that there exists a correlation—in the statistical sense of the term—between the time series expressing the SNIR for users who are physically close to each other. In the case of satellite communications, attenuation on the transmission channel is essentially caused by atmospheric precipitation. On this subject see the paper by U. C. Fiebig, L. Castanet, J. Lemorton, E. Matricciani, F. Pérez-Fontán, C. Riva and R. Watson "Review of Propagation Channel Modeling", 2nd Workshop COST 280, The Netherlands, 26-28 May 2003. Modeling qualified as "exponential" is used to determine that the radius of the "rain cells" inside which all users have correlated channel conditions is of the order of 30-50 km, decreasing as the intensity of precipitation increases. On this subject see the following papers:

O. Fiser, "Estimation of the Space Diversity Gain from Rain Rate Measurements", 1st International workshop COST 280, July 2002, and J. Goldhirsh, "Two-Dimension Visualization Of Rain Cell Structures", Radio Science, Vol. 35, No. 3, pp 713-729, May-June 2000.

It follows that inside a typical transmission beam, having a diameter of about 100 km (a telecommunications satellite generally has a plurality of such beams), it is possible to identify four correlation areas on average.

One method of splitting the beam into "dynamic" correlation areas, i.e. correlation areas that vary in time, consists in identifying the rain cells present at a given time within the footprint of said beam and centering each area on one of said cells. Identification may be based on channel condition information coming from users themselves via a backward channel, for example.

A much simpler method, although offering lower performance, consists in effecting such splitting "statically", that is to say independently of time. This kind of splitting is in part arbitrary, because the boundaries between areas inevitably separate users who are close to each other, who in reality have correlated channel conditions. At the same time, it may happen that at a given time the boundary of a rain cell divides a "correlation" area into two portions having completely different transmission conditions. Nevertheless, it is advantageously possible to take into account the fact that the spatial distribution of users within the footprint of the transmission beam is generally not uniform. Indeed, users are mostly grouped together within a limited number of built-up areas (urban built-up areas). If the correlation areas are centered on these built-up areas and their limits are moved into regions of low user density, the desired result is obtained: the time series representing the SNIR for most users belonging to the same area will be correlated with each other and have no correlation with those of users of other areas. To give a concrete example of this, consider a beam covering part of Switzerland, Southern Germany and Northern Italy; the correlation areas could advantageously be centered on Zurich, Munich and Milan, and their limits could pass over the Alps, which are sparsely populated (in this specific example, the Alps also constitute a physical barrier to meteorological disturbances, which strengthens the separation between areas). To put this in a more quantitative manner, the number N of correlation areas may be determined in the following manner:

Let $A_k$ be the area of the beam k of a multibeam satellite communications system;

Let $U^{k,n}$ be the number of users in the correlation area n of the beam k;

Let $D^k$ and $D^{k,n}$ be, respectively, the user density in the beam k and in the correlation area n; and Let $R_{cell}$ be the radius of a rain cell.

We begin by setting $$N = \frac{A^k}{\pi R_{cell}}$$

and calculate the ratio $$\frac{D^{k,n}}{D^k} = \frac{\frac{U^{k,n}}{A^k/N}}{\frac{\sum_{n=1}^{N} U^{k,n}}{A^k}} = \frac{U^{k,n}}{\frac{\sum_{n=1}^{N} U^{k,n}}{N}} = N \frac{U^{k,n}}{\sum_{n=1}^{N} U^{k,n}}. \text{ If } \frac{D^{k,n}}{D^k} \to 1$$

the number N of correlation areas may be considered sufficient; otherwise it is advisable to increase this number in order to achieve a constant density in terms of the number of users in each area.

Whether the correlation areas are determined "statically" or "dynamically", the aim is to maximize the mean coefficient of correlation between the time series representing the SNIR for the users in each area, or at least to have this mean coefficient exceed a threshold value depending on the specific application, whilst conforming to certain constraints as to the number N of areas, the frequency of updating the split, etc. This threshold value may be at least 0.5, for example, or at least 0.6 for a finer split, or at least 0.7 or at least 0.8 for an even finer split.

Figure 3:
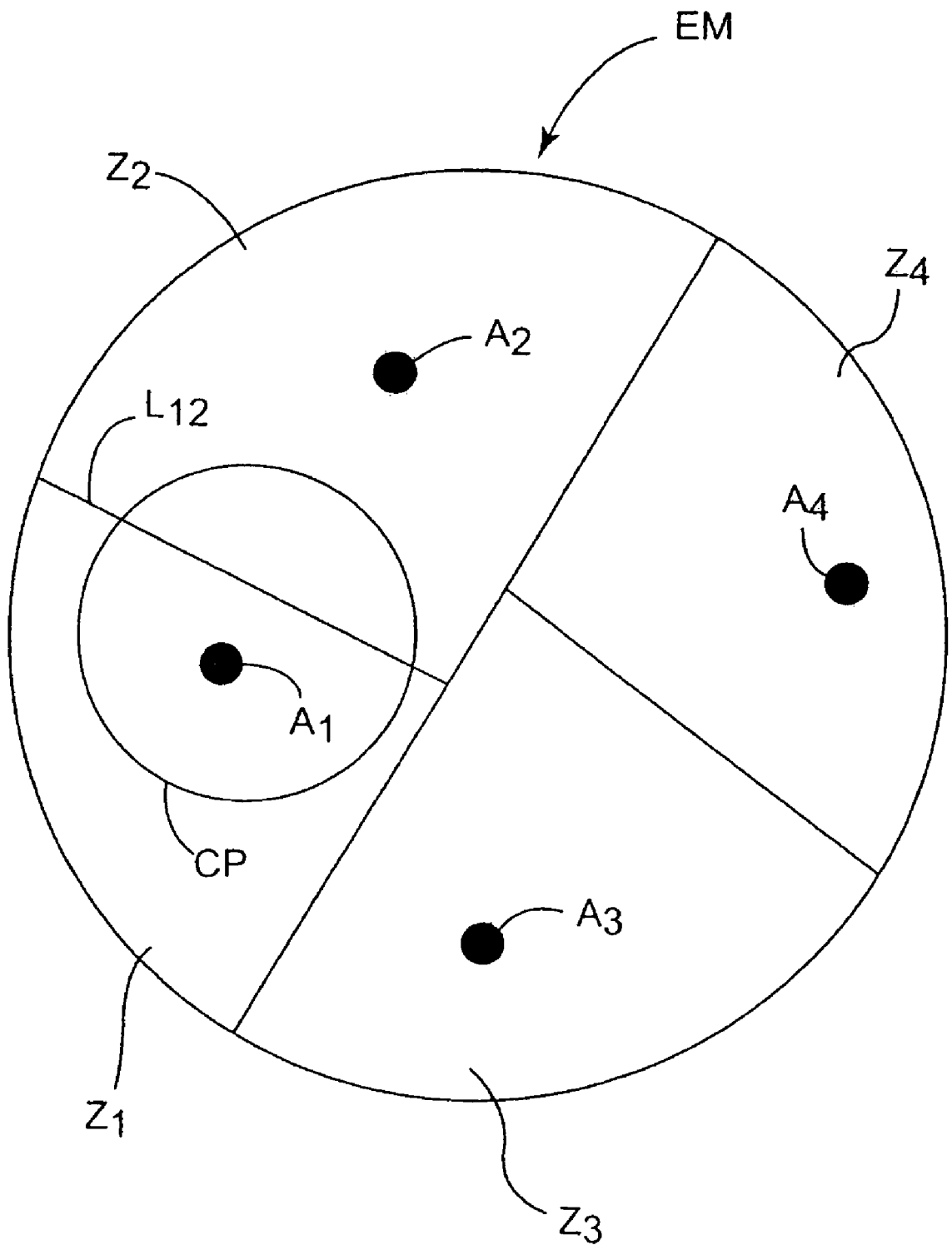
FIG. 3 shows an example of splitting a transmission beam into correlation areas.

FIG. 3 shows, by way of example, the splitting into "static" correlation areas $Z_1$-$Z_4$ of a beam, to be more precise its footprint EM, which covers four built-up areas $A_1$-$A_4$ with a high user density. A rain cell CP straddles the line $L_{12}$ delimiting the areas $Z_1$ and $Z_2$ and covers the built-up area $A_1$. If any two users in the area $Z_1$ are considered, the correlation coefficient calculated over the duration of the rainfall episode between the time series expressing their SNIR may be close to 1, if both said users are inside or outside the cell CP, or close to 0 if one user is inside that cell and the other is outside it. However, because of the non-uniform spatial distribution of users, the mean correlation coefficient calculated considering all possible pairs of users in the area $Z_1$ will be significantly greater than zero in most cases. Similarly, even if a user from the area $Z_1$ and a user from the area $Z_2$ may temporarily have a correlation coefficient between the time series expressing their SNIR close to 1, on average users from different areas will have weakly correlated channel conditions, or even conditions with no correlation at all.

Consequently, even if the split does not take account of changing meteorological conditions, it is approximately justifiable to refer to the areas $Z_1$-$Z_4$ as "correlation areas".

Figure 4:
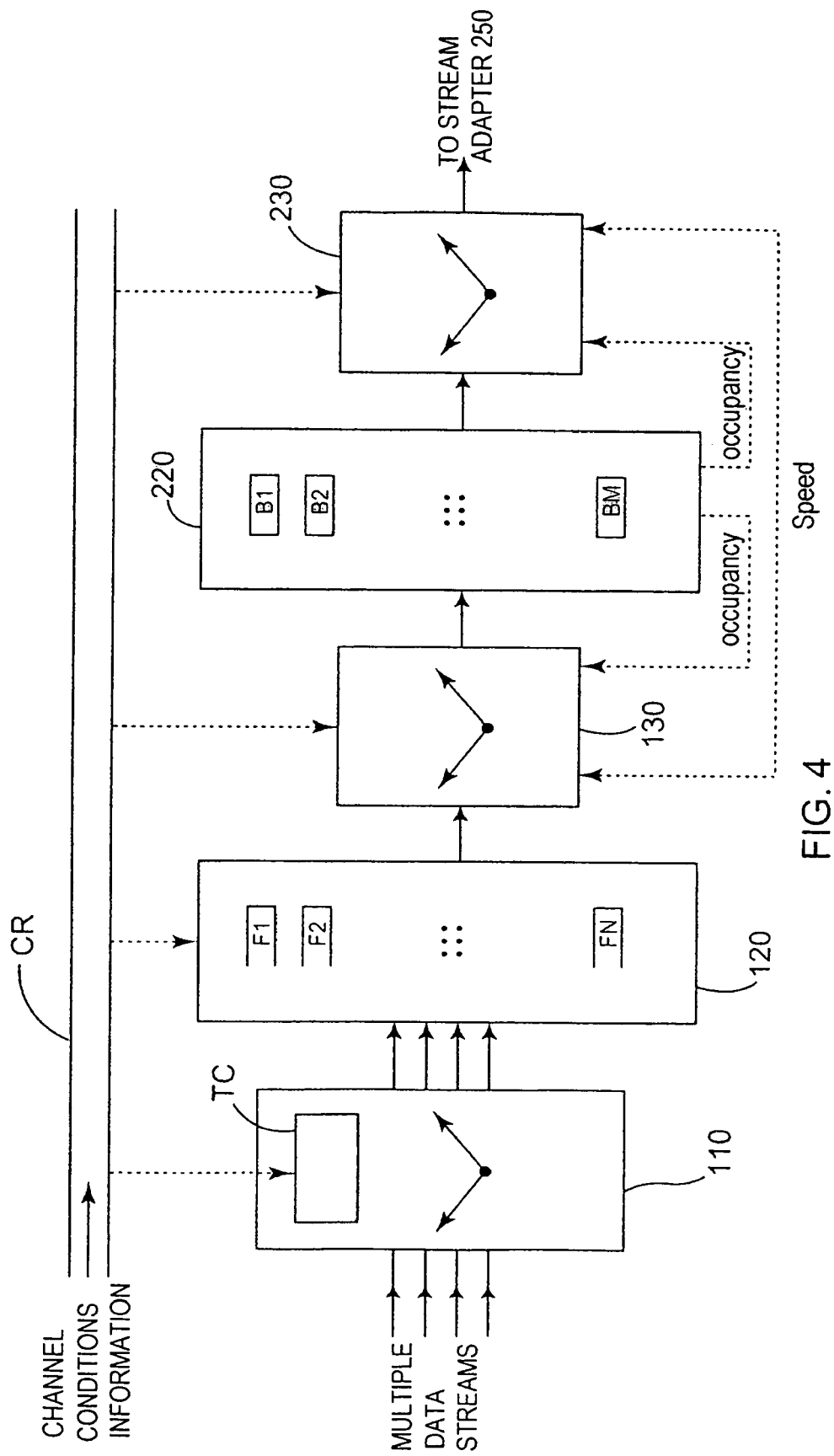
FIG. 4 is a functional block diagram of one embodiment of a device of the invention.

The invention, the theory of which is shown in FIG. 4, is based on a concept that is hitherto unknown in the art, namely the formation of queues for the data packets to be sent on the basis of the correlation area in which the users to which they are addressed are located. However, the protection level (modulation order and coding redundancy) for each packet is preferably determined on the basis of the channel conditions for the addressee user considered individually, without considering the situation of other users in the same area.

Thus the packet classifier 110 includes means for splitting input data packets between the various queues as a function of the geographical position of the users to which they are addressed. One example of such means is an elaboration unit (not shown) comprising a memory storing a table TC of correspondences establishing the correspondence between each user registered by the system and one of the N identified correlation areas. This correspondence table TC may be fixed, if the splitting into correlation areas is static, or variable in time, if said splitting is dynamic. When splitting is dynamic, the correlation areas are redefined periodically on the basis of channel condition information coming from the users themselves via the backward channel CR, for example, and said elaboration unit comprises means for modifying the correspondence table TC accordingly. Thus two users can belong to the same correlation area at a given time and to different correlation areas at a later time, which makes it possible to track changing meteorological conditions.

The set 120 is therefore made up of N queues F1-FN, one for each correlation area. The scheduler 130 works through these queues on the basis of a round-robin (RR) algorithm, which is particularly advantageous because of its simplicity. According to the DVB-S2 standard, packets extracted by the scheduler 130 are forwarded to the mode adapter 210 that is part of the DVB-S2 subsystem, where they are stored in a set 220 of M buffers B1-BM as a function of the required protection level. To be more precise, the scheduler 130 has an input for receiving a signal representing the channel conditions for each user and means (an elaboration unit, not shown in the figure) for determining, on the basis of that signal, which protection level is required for sending each extracted packet and therefore in which buffer B1-BM said packet must be stored. As the queues F1-FN contain packets addressed to users having correlated transmission channel conditions, under normal conditions a major portion of the packets extracted from the same queue will be stored in the same buffer.

As has already been explained in the description given with reference to FIG. 1, a second scheduler 230 then extracts the contents of the buffers to forward them to the stream adapter 250. In the prior art mentioned above, it is always considered that the second scheduler 230 operates on the basis of a simple round-robin plus time-out (RR+TO) algorithm. In contrast, in the context of the present invention, the more general case is considered of an adaptive weighted round-robin plus time-out (AWRR+TO) algorithm. Indeed, at a given time it is probable that only some of the M available protection levels will actually be in use; under these conditions, it is advantageous to use a weighting vector (list of weights) adapted as a function of the buffers to be worked through. The second scheduler 230 has an input for receiving from the set 220 of buffers a signal indicating which memory locations are actually being used at a given time and means (an elaboration unit) for modifying its own scheduling algorithm on the basis of that information. In particular, in the situation considered here, this modification consists in selecting a vector of appropriate weight for AWRR scheduling.

Where applicable, the scheduler 230 also receives a signal indicating that the time-out (TO) has been exceeded by a data packet in a buffer, in which case it interrupts the scheduling sequence to give priority to servicing the queue in which the time-out has been exceeded.

Extraction and transmission of a data block by the second scheduler 230 requires a time that depends on the protection level associated with said block (more precisely the modulation order); the scheduler can proceed to the next block only after this time period has elapsed, under pain of provoking a loss of data, which limits the speed at which the AWRR algorithm is executed. The time-out TO may be defined as the sum of the transmission times $T_m$ for each protection level, for example:

$$TO = \sum_{l}^{M} T_m.$$

Where applicable, the sum may be limited to only those protection levels that are actually in use at a given time: in this way, if a buffer is not serviced during one cycle of the scheduling algorithm, because it was not full, for example, it will certainly be serviced during the next cycle.

The chosen weights of the AWRR algorithm depend on the objectives to be achieved and are outside the scope of the present invention. The WRR+TO and RR+TO algorithms constitute particular embodiments that are simpler but offer more limited services. Moreover, the invention is not limited to the AWRR, WRR and RR algorithms, with or without a time-out TO, but encompasses the use of other scheduling policies.

The first scheduler 130 is controlled to prevent the loss of data packets. In particular, it has an input for receiving a signal representing the state of occupancy of the buffers and means (an elaboration unit) for preventing the extraction of a leading packet from one of said queues if the buffer memory for which said packet is intended does not have sufficient free capacity to store it. Accordingly, before extracting a packet from a queue Fi (i=1-N) intended for the buffer Bj (j=1-M), the scheduler 130 checks if there is sufficient space remaining in the buffer; if not, the packet is not extracted and the scheduler 130 moves onto the next queue.

Clearly, for the process to be efficient, it is necessary for the first scheduler 130 to operate significantly faster than the second scheduler 230. To be more precise, the speed of the first scheduler 130 is determined by that of the second scheduler 230 which, in turn, depends on the number of buffers and thus on the number of protection levels actually in use. It is for this reason that it is preferable to use for the first scheduler 130 an RR algorithm that is particularly simple, and therefore fast, whereas an AWRR+TO algorithm, more flexible but also more complex, and therefore slower, is chosen for the second scheduler 230. Moreover, the schedulers 130 and 230 can each have an input/output for exchanging operating speed information and means (an elaboration unit) for controlling the operating speed on the basis of said information so that the first scheduling algorithm is executed faster than the second scheduling algorithm.

Note that the architecture of the FIG. 4 system enables the protection level suited to each data packet to be determined as late as possible, i.e. at the level of the first scheduler 130, and not at the level of the packet classifier 110. This reduces the risk of the channel conditions changing between the time at which the protection level is determined and the time at which the data is actually sent.

In FIG. 4, the solid line arrows represent the transfer of data to be sent and the dashed line arrows represent the exchanges of operating information, such as the channel conditions, the state of occupancy of a buffer, etc. between the functional units of the system. Moreover, for simplicity, FIG. 4 shows neither the CRC encoder 240 nor the division of the system into an external subsystem 100 and a DVB-S2 subsystem.

Figure 5:
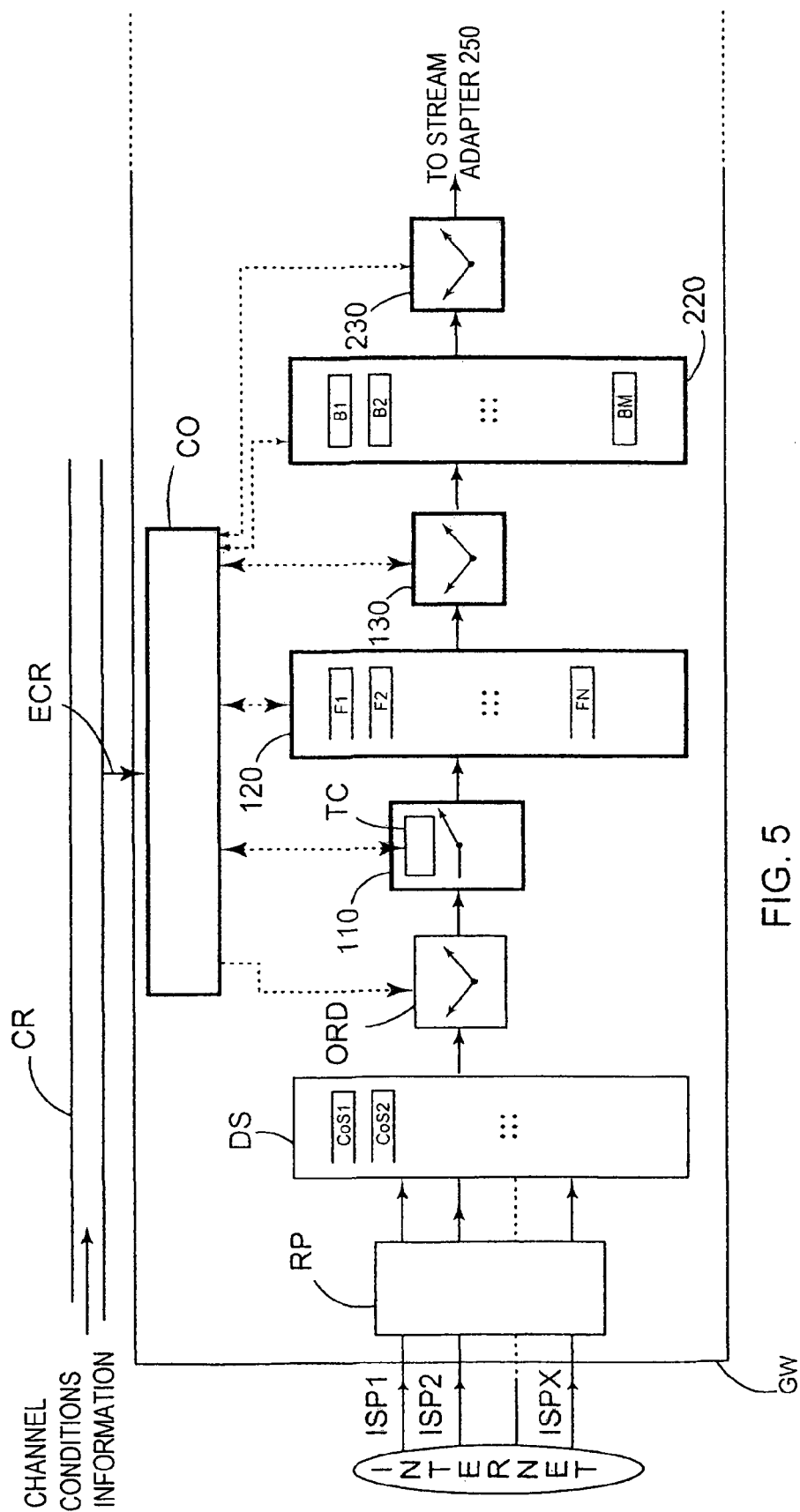
FIG. 5 is a functional block diagram of the FIG. 4 device integrated into a DVB-S2 transmission system adapted to manage Internet traffic.

FIG. 5 shows the application of the invention to a gateway GW for managing Internet traffic and relates to a transparent satellite. This kind of gateway must enable conformance with service level agreements (SLA) entered into by users, support traffic shaping policies, and incorporate a classification of traffic on the basis of different priority levels ("DiffServ"). These functions are implemented on the upstream side of the device of the invention, in the network layer (the $3^{rd}$ layer of the ISO's OSI model), in conformance with the Internet Protocol (IP).

The streams of data coming from different Internet service providers ISP1-ISPx are divided into classes of service (CoS), subjected to traffic shaping by an edge router RP and successively sent to a DiffServ server DS including a number of queues equal to the number of classes of service supported by the system. A DiffServ scheduler ORD taking account of the various priority levels extracts data packets from these queues and forwards them to the packet classifier 110. The edge router RP, the DiffServ server DS and the DiffServ scheduler ORD do not constitute part of the invention and are familiar to the person skilled in the art of communications networks.

Whereas, in the FIG. 4 embodiment, operating information is exchanged directly between the functional units concerned and control is essentially distributed, in the FIG. 5 system a scheduling controller CO receives information representing the transmission channel conditions coming from the backward channel CR via an input ECR, centralizes all this information and sends control signals for controlling the various components. In particular, the controller CO constitutes means for:

determining the protection level (coding redundancy and modulation order) required by each packet on the basis of the information representing the transmission channel conditions coming from the backward channel CR;

modifying the packet distribution geographical criterion on the basis of said information representing the transmission channel conditions;

modifying the scheduling algorithm of the second scheduler 230 on the basis of a signal representing the state of occupancy of the buffers B1-BM;

verifying the state of occupancy of the buffers B1-BM and preventing the first scheduler 130 extracting a leading packet from one of the queues F1-FN if the buffer for which said packet is intended does not have sufficient capacity to store it;

controlling the operating speed of the first and second schedulers, so that the first scheduling algorithm is executed faster than the second scheduling algorithm.

Moreover, and without the following list of tasks being exhaustive, the scheduling controller CO:

controls the DiffServ scheduler ORD, because implementing QoS policies necessitates information on channel conditions;

reads the correspondence table TC to communicate to the first scheduler 130 the geographical area (correlation area) for which each packet is intended;

receives from the set 120 information intended for the schedulers 130 and 230 on the occupancy of the queues F1-FN;

determines the number of correlation areas—and therefore of queues—in use at any time;

receives from the set 120 information intended for the scheduler(s) 130 and/or 230 on the occupancy of the buffers B1-BM and information on exceeding the timeout TO; and determines the number of protection levels—and therefore of buffer memories—in use at any time.

In FIG. 5, the components of this embodiment of the invention, i.e. the packet classifier 110, the correspondence table TC, the set 120 of queues, the set 220 of buffers, the first scheduler 130, the second scheduler 230 and the scheduling controller CO are highlighted by using a thicker line.

Having described the general structure of a device of the invention, it is necessary to proceed to a theoretical analysis of how it works that will serve as a basis for considering concrete cases highlighting the advantages of the invention over the prior art.

A system is considered using M different protection levels, each associated with a range of values of the SNIR. The $m^{th}$ protection level is therefore used if $SNIR \in [\gamma_{m-1}, \gamma_m]$, where $\gamma_I$ indicates SNIR threshold values. A realistic value of the difference between two consecutive thresholds is 1 dB. The spectral efficiency $\eta_m$ of the $m^{th}$ protection level, defined as the number of information bits sent per second and per unit bandwidth, is determined by the modulation order (the number of bits per symbol) and the coding redundancy. The channel capacity $R_m$ associated with the $m^{th}$ protection level (and therefore with the spectral efficiency $\eta_m$) is given by the following equation, in which B is the bandwidth:

$$R_m = B \log_2(1+\gamma_m)$$

For a point $\bar{x}$ in the beam k, the SNIR is given by the equation:

$$[SNIR^k(t|\bar{x})_{TOT}]^{-1} = [SNIR^k(t|\bar{x})_{UP}]^{-1} + [SNIR^k(t|\bar{x})_{DOWN}]^{-1}$$

in which the suffixes UP and DOWN refer to the uplink and downlink, respectively. It is reasonable to ignore the contribution of the uplink, because of the large dimensions of the antenna of the terrestrial transmission station and the possibility of using spatial diversity. Consequently:

$$SNIR^k(t|\bar{x})_{TOT} \cong SNIR^k(t|\bar{x})_{DOWN}$$
$$= SNIR^k(t|\bar{x})$$
$$= \frac{p_r^k(t|\bar{x})}{n(t|\bar{x}) + i_{interbeam}^k(\bar{x}) + i_{external}}$$

in which $p_r^k(t|\bar{x})$ is the power received at the location $\bar{x}$, $n(t|\bar{x})$ the thermal noise at the same location, $i_{interbeam}^k(\bar{x})$ is the interbeam interference, and $i_{external}$ is the interference caused by other systems. The interference terms are considered to be known. The SNIR is therefore calculated as a function of position and time:

$$SNIR^k(t|\overline{x}) = \frac{c(\overline{x})}{R\frac{KT_{SYS}(t|\overline{x})+i_{oext}}{a^2(t|\overline{x})}+i^k_{interbeam}(\overline{x})}$$

where $a^2(t|\overline{x})$ is the attenuation of the channel, $c(\overline{x})$ is the power received under free space propagation conditions, R is the noise bandwidth Hz, and K is Boltzmann's constant in dBW/HzK.

It will be noted that the time-dependency of the SNIR is caused entirely by the attenuation term. It can be simulated by generating attenuation time series, for example as explained in the paper previously cited by U. C. Fiebig, L. Castanet, J. Lemorton, E. Matricciani, F. Pérez-Fontán, C. Riva and R. Watson "Review of Propagation Channel Modeling", 2nd Workshop COST 280, The Netherlands, 26-28 May 2003.

If the second scheduler 230 is considered to employ an (A)WRR algorithm, a scheduling policy is defined by the vector $w=[w_1, \ldots, w_M]$ of the weights assigned to each protection level ($w_i \in N \; \forall i=1-M$) or, what amounts to the same thing, by the normalized weights $$\phi_i = \frac{w_i}{\sum_{j=1}^{M} w_j}.$$

There follows an introduction to three fundamental concepts: stability, stable data rate region and maximum data rate region.

A system is said to be stable if the maximum length of the queues at the level of the sender is limited. In the situation considered here, this means that the rate of arrival of the packets for each protection level is less than the maximum data rate possible for the protection level concerned.

In the M-dimensional hyperplane of the possible data rate values for all the protection levels supported by the system, the stable data rate region consists of the set of points associated with permissible combinations of data rate values for all protection levels, i.e. the combinations such that the maximum value of the data rate for each protection level is not exceeded. It is given by the equation:

$$S = \left\{ \overline{r} \in \mathcal{R}^M, r_m = \phi_m R_m \Big/ \sum_{m=1}^{M} \phi_m = \sum_{m=1}^{M} \frac{r_m}{R_m} < 1, \phi_m \in [0,1] \right\}$$

The maximum data rate region is the boundary of the stable data rate region ((M−1)-dimensional hyperplane). It defines the maximum data rate values for which the system can be stable and is defined by the following equation:

$$S^{max} = \left\{ \overline{r} \in \mathcal{R}^M \Big/ \sum_{m=1}^{M} \phi_m = \sum_{m=1}^{M} \frac{r_m}{R_m} = 1, \phi_m \in [0,1] \right\}$$

Figure 6A:
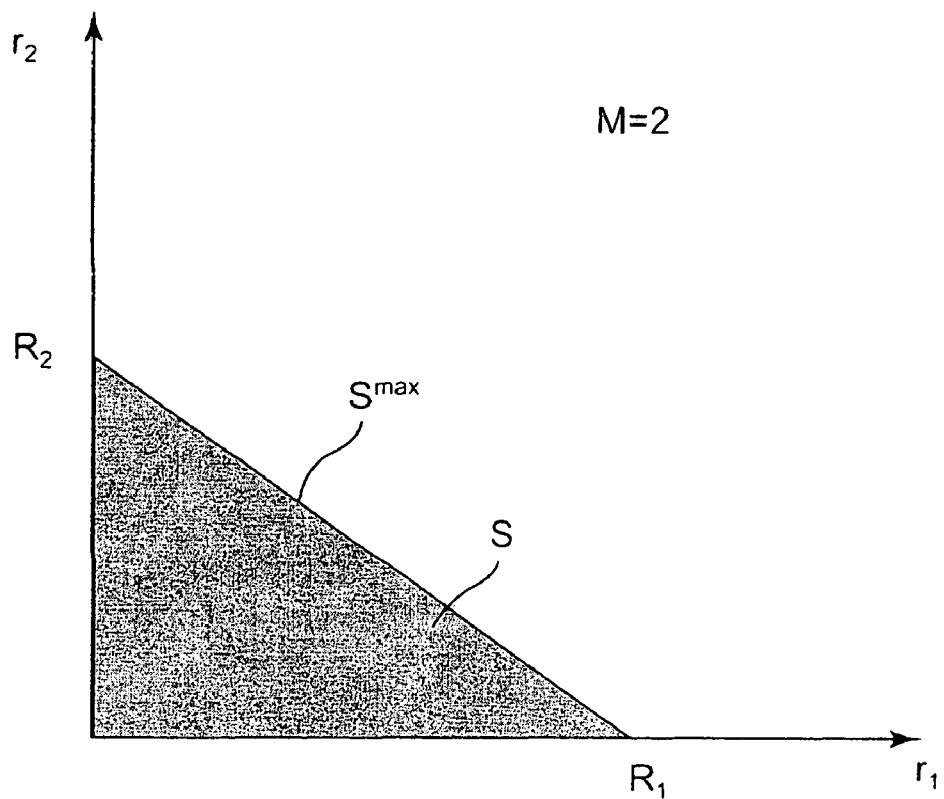
FIGS. 6A and 6B are diagrams illustrating stability, stable data rate region and maximum data rate region concepts that are useful for understanding the invention.

FIG. 6A is a graphical representation of these concepts for the simple situation M=2 (i.e. two protection levels). In this figure, the abscissa and ordinate axes respectively represent the data rates $r_1$ and $r_2$ for the first and second protection levels. The line $S^{max}$ (hyperplane with M−1=1 dimension) represents the maximum data rate region and the region S (with M=2 dimensions) between the axes and $S^{max}$ represents the stable data rate region.

Figure 6B:
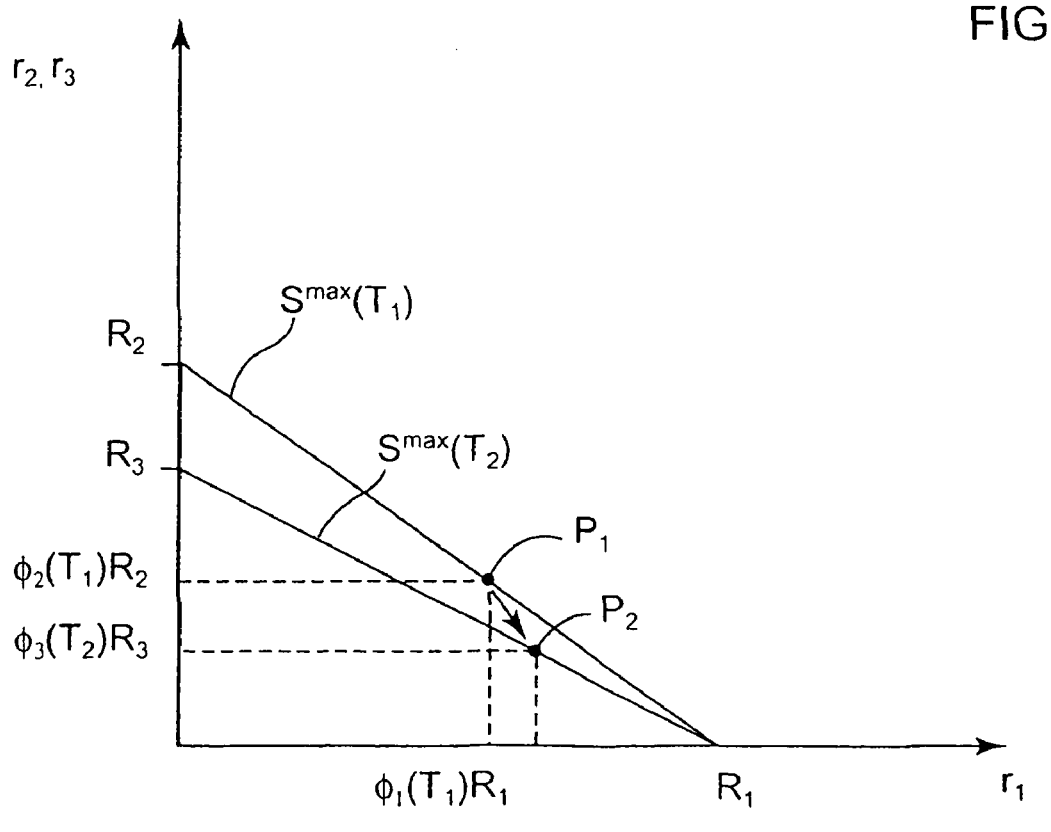

FIG. 6B shows an example of the adaptation of the weights of the AWRR scheduling algorithm following a change in transmission conditions. It is assumed that at time $T_1$ only two protection levels are in use: levels 1 and 2. The operating point $P_1 \in S^{max}(T_1)$ is identified by the coordinates $(r_1(T_1)=\phi_1(T_1)R_1; r_2(T_1)=\phi_2(T_1)R_2)$. At time $T_2$, following deterioration of the channel conditions for users who are using protection level 2, level 2 ceases to be used and is replaced by level 3, which has a lower spectral efficiency. The system reacts by modifying the weights $\phi_1, \phi_3$ to maintain the point $P_2=(r_1(T_2)=\phi_1(T_2)R_1; r_3(T_2)=\phi_3(T_2)R_3)$ on the line $S^{max}(T_2)$ that represents the maximum data rate region under the new transmission conditions.

Consider next digital simulations carried out using the OPNET software from OPNET Technologies, Inc., 7255 Woodmont Avenue, Bethesda, Md. 20814, United States. The system has the following specifications:

Number of beams: 43 (the invention is applied to each beam individually);
Beam footprint diameter: ~200 km
Carrier frequency: 20 GHz
Multiple access mode: TDMA
Symbol frequency $R_s$: 30 MBaud
Frequency re-use factor: 3
Saturation power per beam: 16 dBW
Transmit antenna peak gain: 50 dB
G/T ratio of user satellite terminal: 17.85 dB/K The channel capacity in bits per second is given by the product of the symbol frequency $R_s$ and the highest spectral efficiency $\eta_m$ supported by the system. The symbol frequency $R_s$ is linked to the bandwidth B by the equation $R_s=B/(1+\alpha)$, in which $\alpha$ is the roll-off factor.

The simulations are effected considering a single beam and splitting it into four correlation areas. To be more precise, a beam centered on Europe is considered, having a diameter of approximately 200 km; the correlation areas are as follows:

Correlation area 1: longitude$\in[8.3°, 10.50°]$, latitude $\in[46.1°, 48.10°]$
Correlation area 2: longitude$\in[10.5°, 12.30°]$, latitude $\in[46.1°, 48.10°]$
Correlation area 3: longitude$\in[8.3°, 10.5°]$, latitude $\in[43.4°, 46.10°]$
Correlation area 4: longitude$\in[10.5°, 12.30°]$, latitude $\in[43.4°, 46.10°]$ Inside one of said areas, the attenuation has a coherence time, defined as the time for which the channel conditions may be considered constant, at least of the order of 1 s. As the system responds only to attenuation variations of at least 1 dB (the interval between two threshold levels $\gamma_i$) and experiments show that the rate of variation with time of the attenuation very rarely exceeds 0.5 dB/s, a value of 1 s constitutes a very cautious estimate of the coherence time.

For an experimental study of the rate of time variation of attenuation events in the Ka band, see the paper by Erkki T. Salonen, Pasi A. O. Heikkinen, "Fade slope analysis for low elevation angle satellite links", COST 280, $2^{nd}$ Workshop, ESTEC, May 2003.

Figure 7:
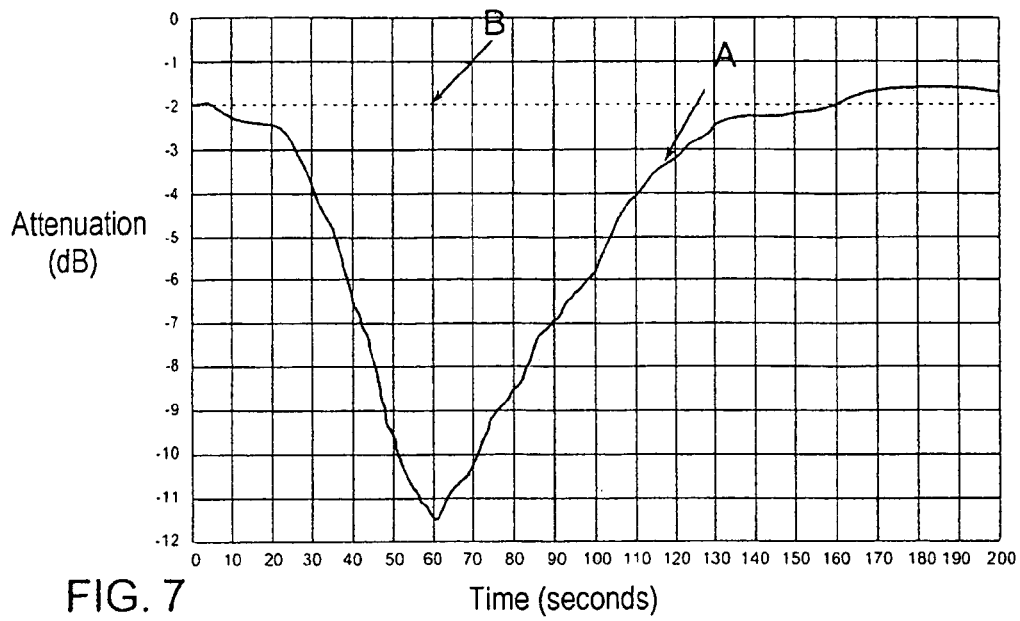
FIG. 7 shows an example of an attenuation time series used in simulations for comparing the invention and the prior art.

It is considered that all users are initially experiencing clear sky conditions, with a channel attenuation of −2 dB. From the time t=0, there occurs a rain event of approximately 160 s duration, uniformly affecting half the users (all the users in areas 1 and 2) and increasing the attenuation value to approximately −11.5 dB. The variation of the attenuation level with time is represented in the FIG. 7 graph. As explained above, it is important to consider that a uniform attenuation value does not imply a uniform SNIR value because the SNIR value is also position-dependent by way of interbeam interference $i_{interbeam}^{k}(\overline{x})$ and signal intensity $c(\overline{x})$ under free space propagation conditions.

The case is considered first of a system based on a prior art architecture based on the formation of queues on the basis of the QoS level (see FIG. 2B). In fact, for simplicity, only one QoS class is considered: there is therefore only one queue for all the packets. The scheduler 230 executes an RR+TO algorithm, with TO=20 ms. The number of protection levels, and therefore of buffers, is M=23. For more details as to the various protection levels, see section 5.5.2.2 of the ETSI document EN 302 307 cited above. The size of each buffer is equal to twice the minimum number of bits required by the corresponding coding algorithm. The highest spectral efficiency supported by this system is 3 bits/s/Hz and the capacity of the channel is therefore 90 Mbit/s.

Figure 8A:
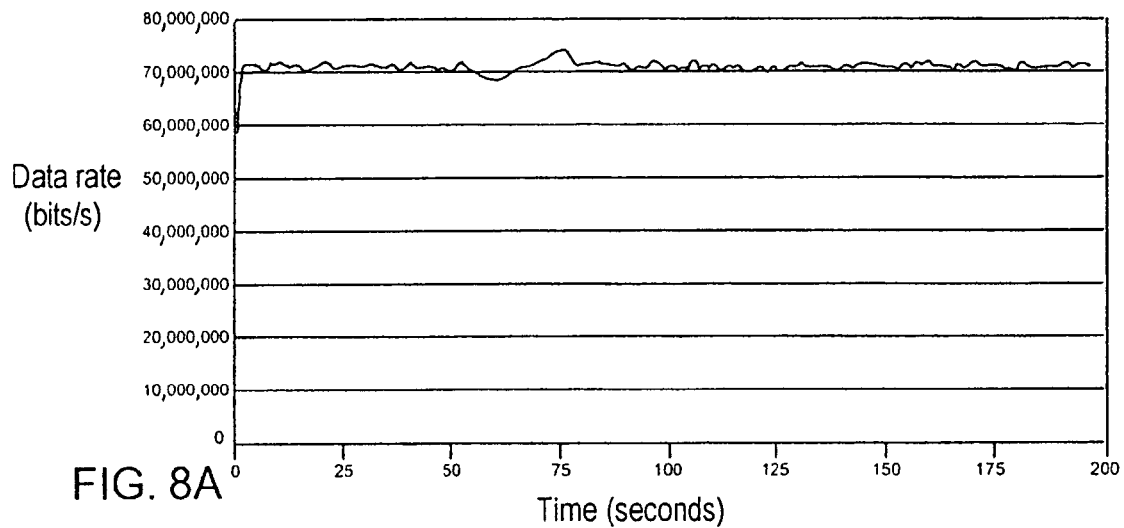
FIGS. 8A, 8B, 9A, 9B and 9C are graphs showing the unsatisfactory performance of a prior art device.
Figure 8B:
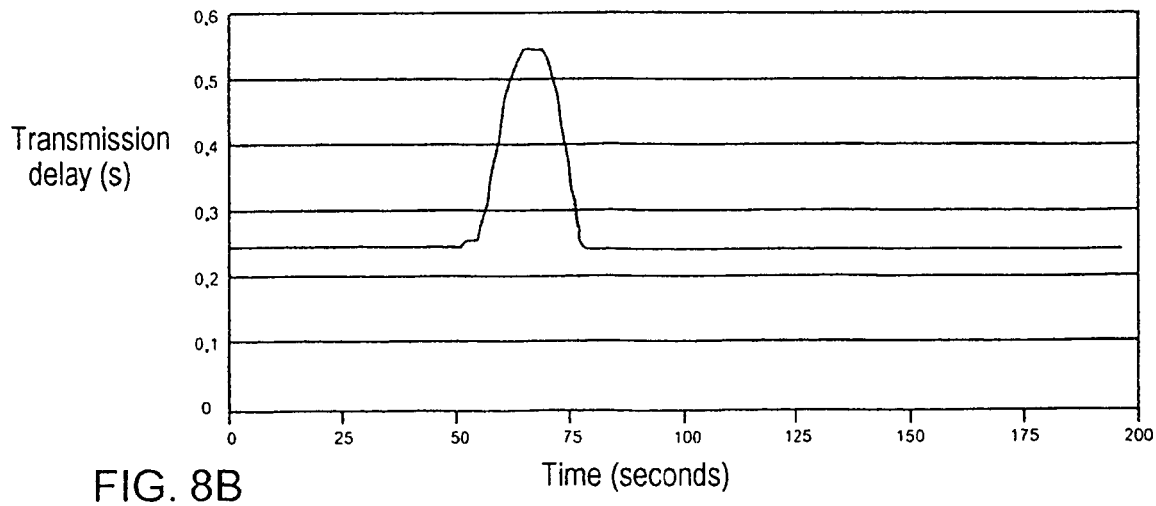

FIG. 8A shows the evolution with time of the total data rate: the initial value of the data rate is 70 Mbit/s, which means that the system is loaded to approximately 80% of the channel capacity; a decrease in the data rate is observed in corresponding relationship to the attenuation peak (t≈60 s), followed by an increase to a value above the initial value of 70 Mbit/s. Although these data rate variations appear small, the increase in the delay suffered by the data packets, which is shown in FIG. 8B, is not negligible: there is a change from an initial value of approximately 240 ms (caused almost entirely by the propagation delay) to approximately 540 ms, which is an increase by a factor of more than 2.

Figure 9A:
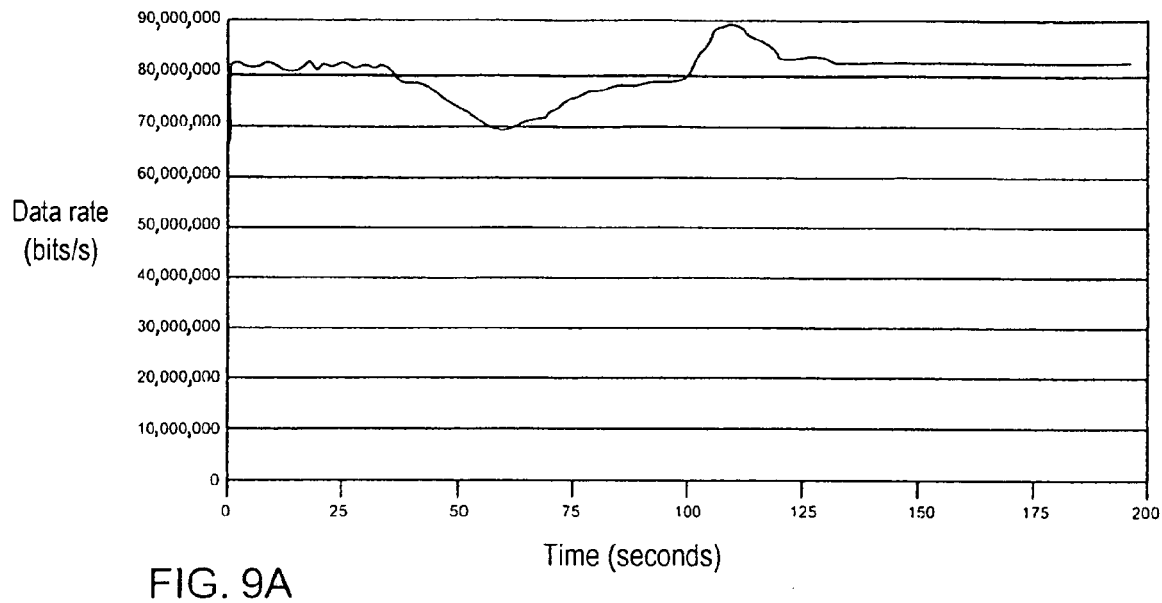
Figure 9B:
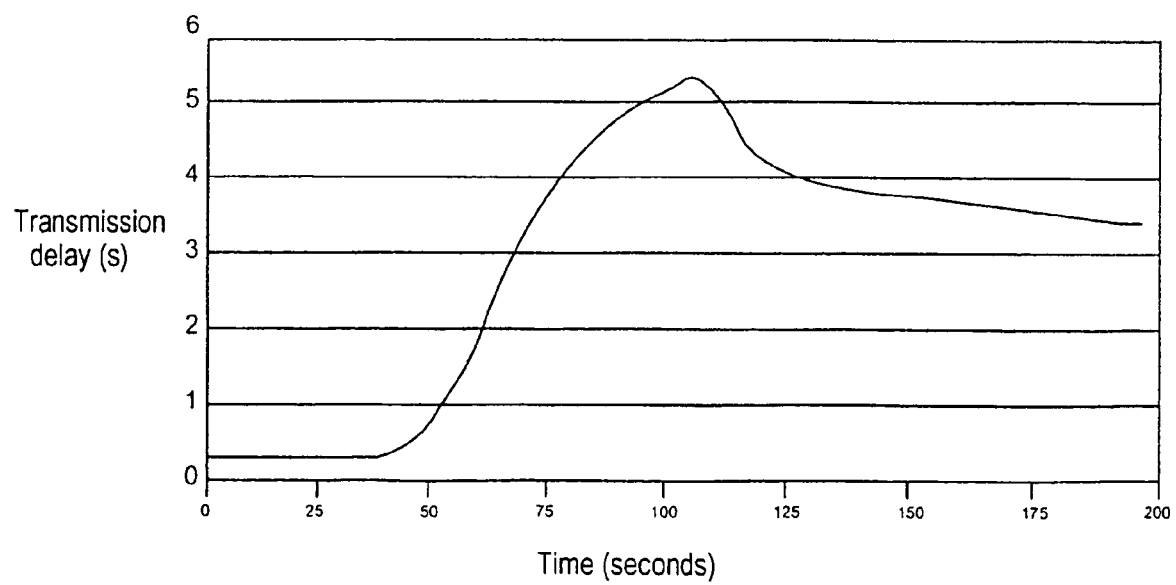

If the system operates at 90% of its initial capacity (approximately 80 Mbit/s), the variations in the data rate (FIG. 9A) and the delay (FIG. 9B) become much greater. In particular, the delay exceeds 5 s, which is entirely incompatible with real time applications, and decreases very slowly after the end of the attenuation event.

Figure 9C:
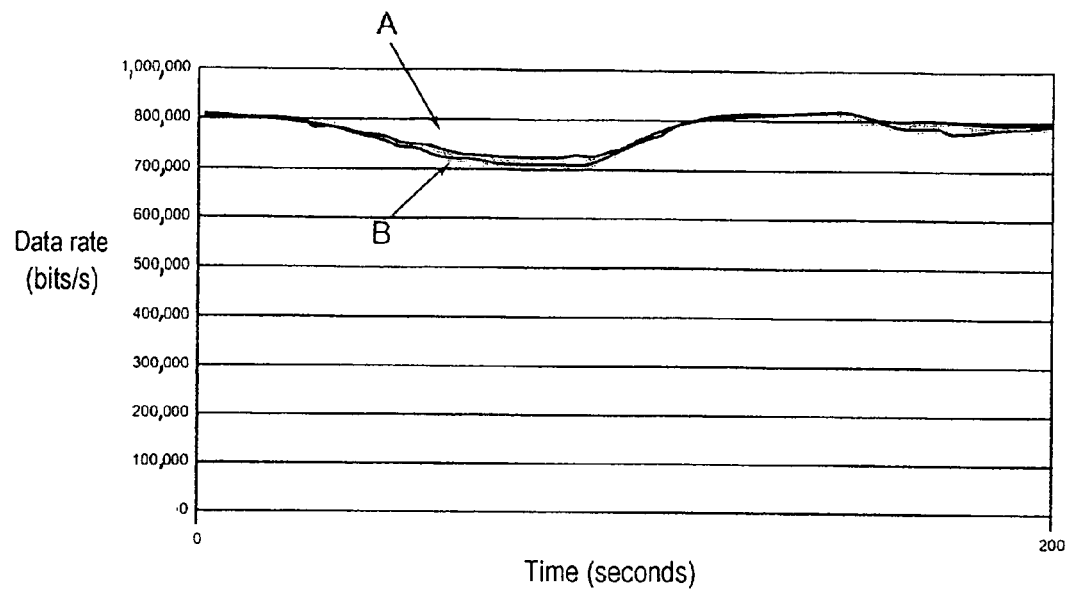

FIG. 9C compares the data rate for a user A who has suffered from attenuation and for a user B who has continued to experience good transmission conditions: it can be seen that the event affects the two users substantially equally. The system therefore does not provide isolation between users.

In accordance with the DVB-S2 standard, the data packets sent all comprise the same number of bits (after coding), and thus a variable number of symbols, which depends on the modulation order being used; the throughput in symbols/s being constant, the packet sending time also depends on the modulation order. For example, if, during the attenuation event, the system uses 32AQSK modulation (5 bits per symbol) for the second user and QPSK modulation (2 bits per symbol) for the first user, the transmission time ratio is 2.5. Because all the packets form a single queue, the user with the longest transmission time slows the sending of data to all the other users. Clearly considering a plurality of QoS levels, and therefore a plurality of queues, would not solve the problem: in all queues packets would be found intended both for users experiencing good channel conditions and for users experiencing high attenuation, with the latter slowing transmission for the former. Use in the second scheduler 230 of a more sophisticated algorithm, such as the AWRR algorithm, would not avoid this problem either. Generally speaking, forming queues on the basis of a criterion of sorting packets by QoS level cannot isolate users and guarantee a minimum data rate to those experiencing good channel conditions.

Sorting packets geographically makes it possible, at least approximately, to form separate queues for users B experiencing different transmission conditions: this avoids the drawbacks of the prior art.

Figure 10A:
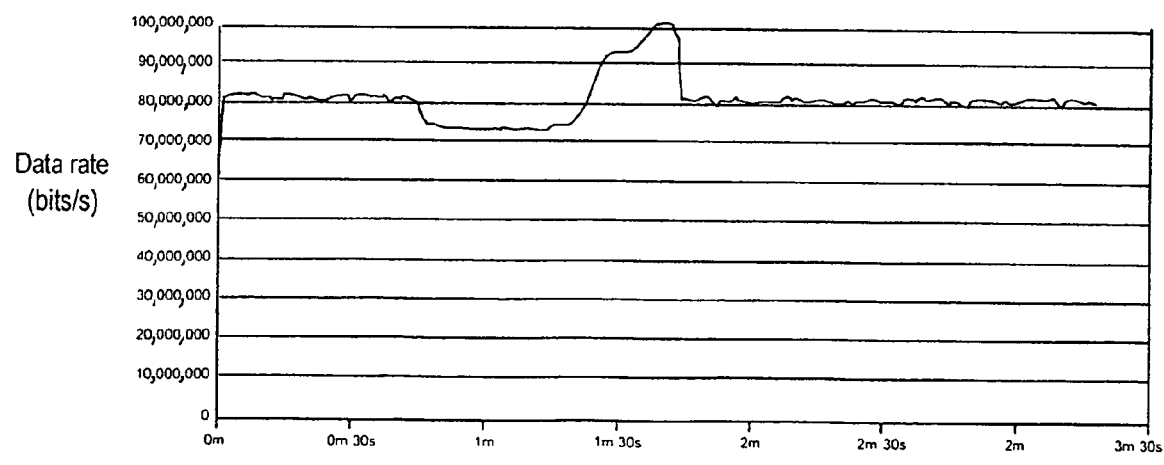
FIGS. 10A and 10B are graphs showing the performance of a first embodiment of the invention.
Figure 10B:
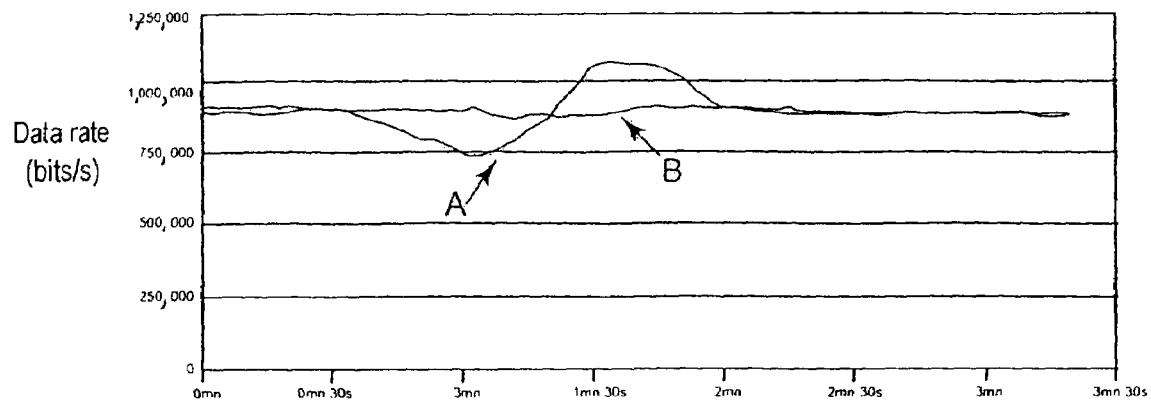

To demonstrate this, consider a particularly simple embodiment of the invention. Only two protection levels (M=2) are used, characterized by respective spectral efficiencies of 2 and 3: the channel capacity is therefore 90 Mbit/s and the system is loaded to 90% of that capacity (81 Mbit/s). The scheduling algorithm of the scheduler 230 is an RR+TO algorithm, with TO=1 s. FIG. 10A shows the effect of the attenuation event from FIG. 7 on the total data rate: the variations are greater than in the preceding situation, because of the small number of protection levels used. Nevertheless, FIG. 10B, which compares the data rate values for said users A and B, shows that the system is capable of providing practically perfect isolation, and therefore of guaranteeing a minimum data rate to users experiencing good channel conditions, regardless of the channel conditions for other users. This is because of the choice to sort packets geographically.

Nevertheless, the geographical criterion for forming queues is not, on its own, capable of providing such isolation under all conditions. Consider next a system for which M=4. The transmission times for the various protection levels are:

Level #1: T1=0.4428 ms

Level #2: T2=0.738 ms

Level #3: T3=0.738 ms

Level #4: T4=0.738 ms

The fact that the same transmission time is associated with different protection levels should not come as a surprise: levels #2-#4 all use the same modulation (8PSK) with different coding, whereas level #1 uses 32APSK modulation. In this situation, the spectral efficiency of level #1 is $\eta_1$=3.75; consequently, the channel capacity is 112.5 Mbit/s. The system is considered to be loaded to 80% of the channel capacity.

Figure 11A:
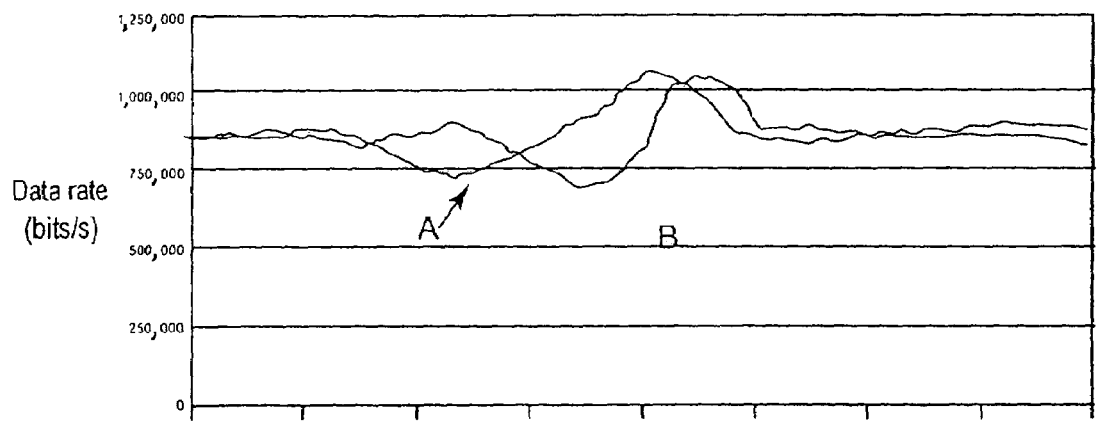
FIGS. 11A, 11B and 11C are graphs showing the performance of a variant of said first embodiment, highlighting its limitations.
Figure 11B:
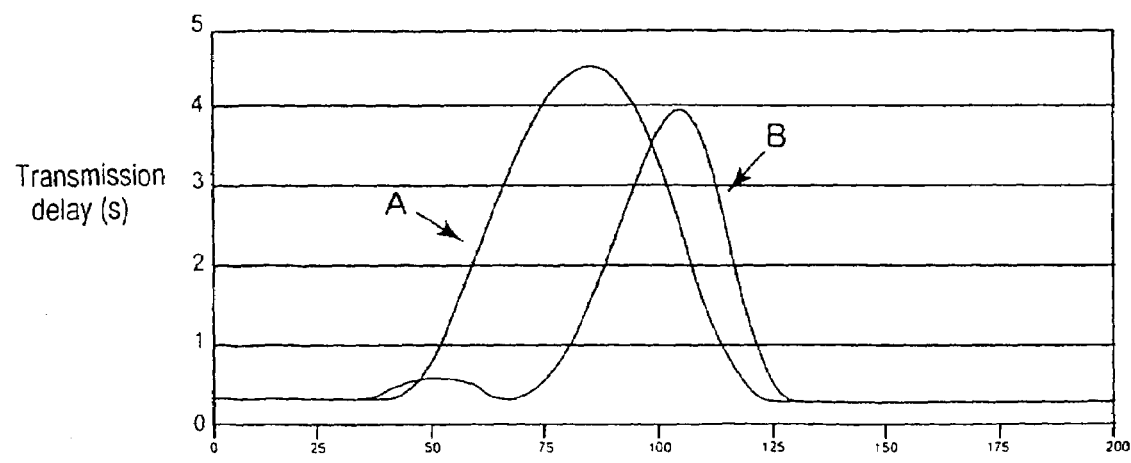

FIGS. 11A and 11B show that, under these conditions (M>2), if the scheduler 230 uses a simple RR+TO algorithm, isolation between the users A and B is not obtained, in terms of either data rate or transmission delay. This is explained by the fact that there are more "slow" levels (#2-#4) than "fast" levels (#1). When all the protection levels are used, a packet addressed to a user who does not suffer any attenuation (B) can be sent only every T2+T3+T4=2.214 seconds. It is therefore clear that the effects of channel deterioration for certain users are propagated to other users, even though they continue to experience good transmission conditions.

Figure 11C:
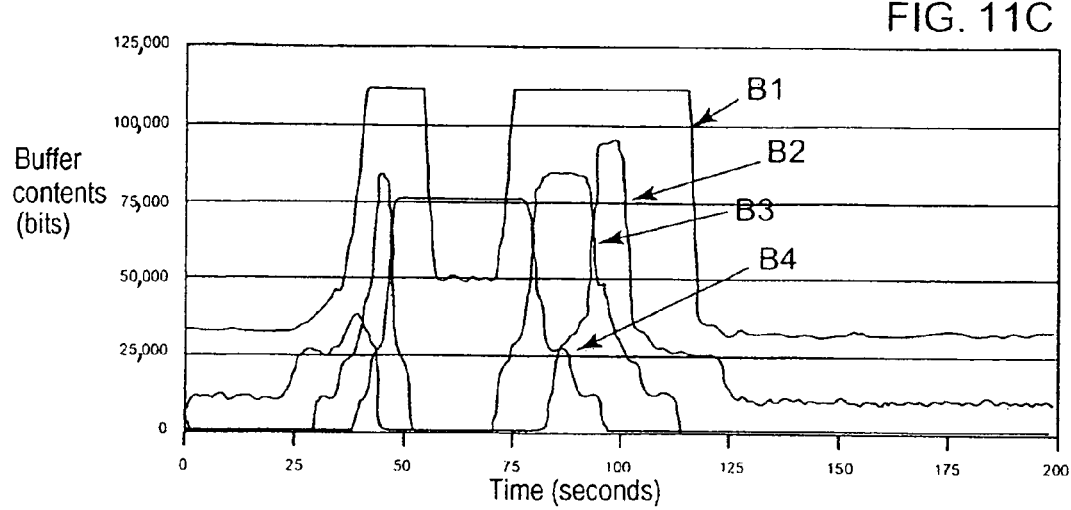

FIG. 11C shows the content in information bits of the various buffers B1-B4 as a function of time: it is seen that as the attenuation increases, higher protection levels come into play. At the attenuation peak, only the $1^{st}$ level (users not affected by the attenuation episode) and the $4^{th}$ level (highest protection level) are actually used.

A higher level of isolation between users may be achieved by using an AWRR+TO scheduling algorithm, which constitutes a preferred embodiment of the invention. One criterion for weighting the scheduling algorithm that achieves approximately equitable assignment of resources (transmission time) between the various protection levels is therefore that set out in Table 1 below, in which "X" indicates a protection level that is actually used:

TABLE 1

| \#1 | \#2 | \#3 | \#4 | Weight |
|---|---|---|---|---|
| X |   |   |   | (1, 0, 0, 0) |
| X | X |   |   | (1, 1, 0, 0) |
| X |   | X |   | (1, 0, 1, 0) |
| X |   |   | X | (1, 0, 0, 1) |
| X | X | X |   | (2, 1, 1, 0) |
| X | X |   | X | (2, 1, 0, 1) |
| X |   | X | X | (2, 0, 1, 1) |
| X | X | X | X | (2, 1, 1, 1) |

Because $T1 \approx 1.67\, T2$, assigning the first protection level twice the weight of the other protection levels achieves an approximately equitable distribution of resources.

Figure 12A:
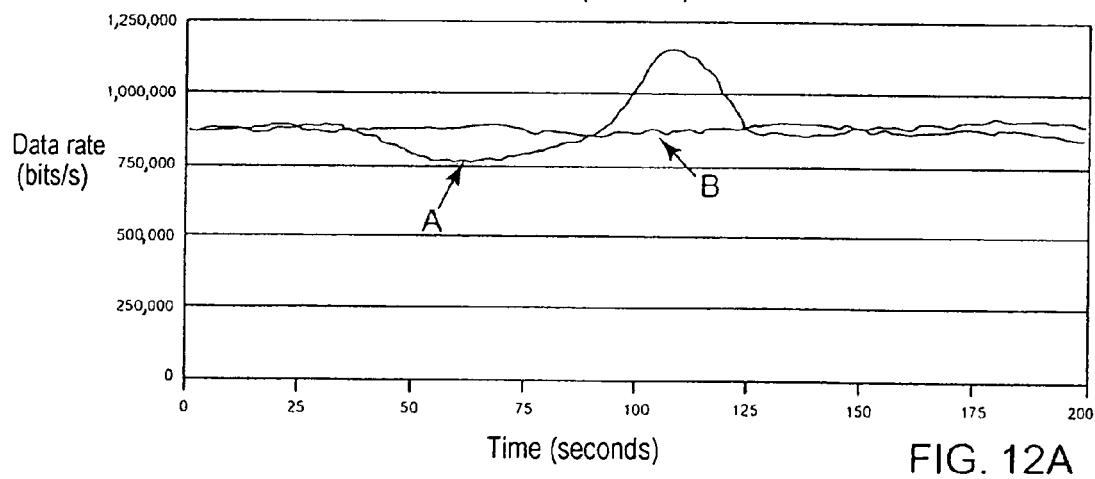
FIGS. 12A and 12B are graphs showing the performance of a second embodiment of the invention.
Figure 12B:
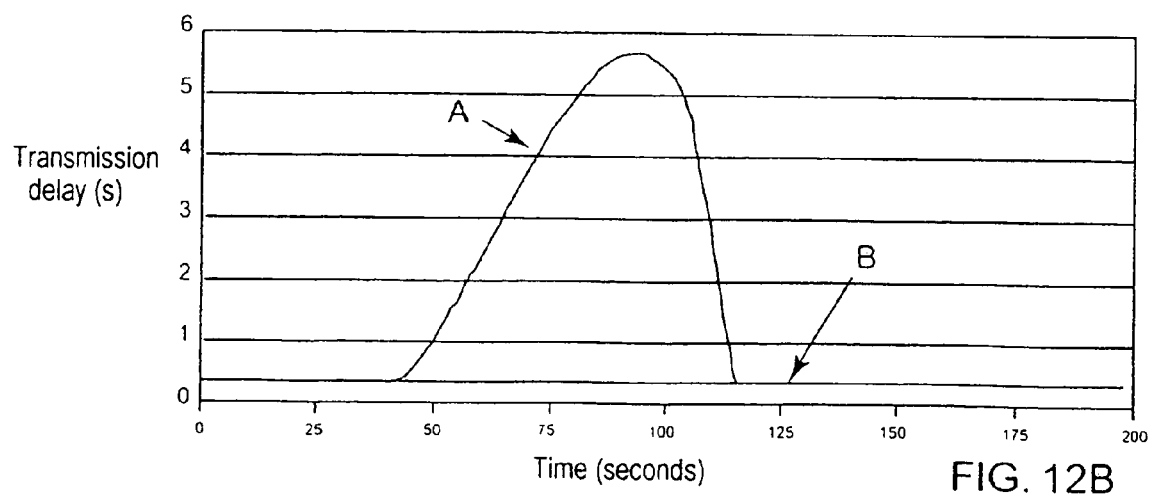

FIGS. 12A and 12B show that a very good level of isolation is obtained, at the cost of a slight increase in the maximum transmission delay for users suffering the highest attenuation. The system is loaded to 80% of its maximum data rate, whereof 40% is associated with users "B" who continue to experience good channel conditions and 40% with users "A" who are experiencing the FIG. 7 attenuation episode. Initially only protection level #1 is used and the system is stable. When two different protection levels are used (for example levels #1 and #2), protection level #1 has access to the channel for approximately 54% of the total time: users "B", who need a data rate equivalent to 40% of the capacity of the system, have access to 54% of the resources, and therefore do not suffer the consequences of the attenuation episode. If three or four protection levels are used, the data rate assigned to users "B" may fall below 40%, causing a slight increase in the transmission delay. Thus FIG. 12A shows that isolation is not perfect but is nevertheless satisfactory.

As a general rule, if truly equitable access to the transmission channel is required, the rates assigned to the protection levels other than the first must be inversely proportional to the respective transmission times. For example, because $T1 = 3/5\,T2 = T4$, the following weighting could be used:

TABLE 2

| \#1 | \#2 | \#3 | \#4 | Weights |
|---|---|---|---|---|
| X |   |   |   | (1, 0, 0, 0) |
| X | X |   |   | (5, 3, 0, 0) |
| X |   | X |   | (5, 0, 3, 0) |
| X |   |   | X | (5, 0, 0, 3) |
| X | X | X |   | (10, 3, 3, 0) |
| X | X |   | X | (10, 3, 0, 3) |
| X |   | X | X | (10, 0, 3, 3) |
| X | X | X | X | (15, 3, 3, 3) |

Compared to the Table 1 example, this scheduling policy penalizes users "A" more strongly but provides perfect isolation for users "B". It is important to remember that, in this context, "equitable access" does not mean that all protection levels have the same access time to the channel, but that users experiencing "good" conditions (level #1) have the same access time as those experiencing "bad" conditions (levels #2 to #4). Within each category, the access time is evenly distributed.

More generally, it would be possible to provide another level of guaranteed data rate to users experiencing better channel conditions. For example, the following table guarantees users experiencing good transmission conditions (protection level #1) access to the channel for at least three quarters of the total time:

TABLE 3

| \#1 | \#2 | \#3 | \#4 | Weights |
|---|---|---|---|---|
| X |   |   |   | (1, 0, 0, 0) |
| X | X |   |   | (5, 1, 0, 0) |
| X |   | X |   | (5, 0, 1, 0) |
| X |   |   | X | (5, 0, 0, 1) |
| X | X | X |   | (10, 1, 1, 0) |
| X | X |   | X | (10, 1, 0, 1) |
| X |   | X | X | (10, 0, 1, 1) |
| X | X | X | X | (15, 1, 1, 1) |

In effect:

$$5 \cdot T1 = \tfrac{3}{4}(5 \cdot T1 + T2) = \tfrac{3}{4}(5 \cdot T1 + T3) = \tfrac{3}{4}(5 \cdot T1 + T4),$$

$$10 \cdot T1 = \tfrac{3}{4}(10 \cdot T1 + T2 + T3) = \tfrac{3}{4}(10 \cdot T1 + T2 + T4)$$
$$= \tfrac{3}{4}(10 \cdot T1 + T3 + T4),$$

$$15 \cdot T1 = \tfrac{3}{4}(15 \cdot T1 + T2 + T3 + T4).$$

Generally speaking, by choosing appropriate scheduling criteria, the invention achieves various objectives, of which only a few examples have been discussed here. The scope of the invention is therefore not limited to particular choices of weighting vectors or to particular scheduling algorithms.

Although the invention has been described with reference to a satellite communications system, and more particularly to a system conforming to the DVB-S2 standard, it may be applied to other communications systems provided that the data packets to be routed can be sorted on the basis of a user geographical position criterion.

Similarly, other technical features of the systems described in the present application merely constitute examples and are not limiting on the scope of the invention. For example, although only time-division multiplexing (TDM) has been discussed, the invention applies equally to frequency-division and code-division systems.

Again, transmission at a constant symbol throughput with adaptive modulation and coding could be replaced by adaptive throughput transmission, for example. The "protection level" concept for sending a data block is consequently not limited to adaptive modulation and coding, but may encompass the use of different symbol throughputs and/or signal power levels, for example.

In the embodiments considered here, the "protection level" of the data packets is a function only of the channel conditions, but processing differently different packets addressed to the same user can be envisaged. For example, sensitive data can be sent with a higher protection level—and therefore with a lower data rate—than information able to tolerate a higher error rate. Moreover, the information on channel conditions used to choose the data protection level, and where applicable for dynamic determination of the correlation areas, does not necessarily come from the users themselves via a backward channel. For example, this information could be obtained via a second communications signal or indirectly from meteorological data.

What is claimed is:

1. A method of scheduling and sending data packets with a required level of protection from a common sender to a plurality of users sharing a common transmission channel, the method comprising the steps of:

receiving a stream of input data packets;

splitting said packets between a plurality of queues;
extracting the leading packets from said queues using a first scheduling algorithm;
storing each packet in a particular buffer of a set of buffers as a function of the level of protection required when sending it;
extracting data blocks from said buffers using a second scheduling algorithm; and
sending said data blocks with the required level of protection over said common transmission channel;
wherein the packets are split between said plurality of queues in accordance with a geographical position criterion in respect of the user to whom each packet is addressed.

2. A method according to claim 1, wherein said step of splitting said packets between queues in accordance with a geographical position criterion includes identifying geographical areas such that the time series of values of a quantity representing transmission channel conditions for users situated in the same area are correlated with each other on average.

3. A method according to claim 2, wherein identifying geographical areas takes into account the spatial distribution of users in order to centre said geographical areas on the highest user density regions so that the limits between areas are in regions of lower user density.

4. A method according to claim 2, wherein identifying geographical areas is based on information representing transmission channel conditions.

5. A method according to claim 4, wherein each user sends said information representing transmission channel conditions to the common sender via a backward channel.

6. A method according to claim 4, wherein identifying geographical areas is repeated periodically.

7. A method according to claim 4, wherein said information representing transmission channel conditions indicates the signal to noise plus interference ratio.

8. A method according to claim 1, wherein the level of protection required for sending each data packet is determined as a function of information representing transmission channel conditions sent by each user to the common sender via a backward channel.

9. A method according to claim 1, also including a step of coding said data blocks with a coding weight depending on the required level of protection.

10. A method according to claim 1, further including a step of grouping the bits of said data blocks into symbols with the number of bits per symbol depending on the required level of protection.

11. A method according to claim 10, further including sending said symbols to said users via said shared transmission channel at a constant symbol data rate.

12. A method according to claim 1, wherein said first scheduling algorithm is executed faster than said second scheduling algorithm.

13. A method according to claim 1, wherein said first scheduling algorithm is a round-robin scheduling algorithm.

14. A method according to claim 1, wherein said second scheduling algorithm is a weighted adaptive round-robin scheduling algorithm with time-out.

15. A method according to claim 1, wherein, before extracting a data packet from one of said queues, said first scheduling algorithm verifies the state of occupancy of the buffer for which said packet is intended and extracts said packet only if said buffer can store it.

16. A method according to claim 1, wherein said common transmission channel is a satellite transmission beam.

17. A device for scheduling data packets to be sent with a required level of protection from a common sender to a plurality of users sharing a common transmission channel, the device including:
an input for receiving a stream of data packets to be sent;
a packet classifier for splitting said packets between a plurality of queues;
a set of memory locations for providing a plurality of queues;
a set of buffers;
a first scheduler for extracting leading packets from said queues using a first scheduling algorithm and forwarding them to a particular buffer memory of said set as a function of the level of protection required when sending it; and
a second scheduler for extracting data blocks from said buffers using a second scheduling algorithm;
wherein said packet classifier comprises means for splitting the packets between said queues according to a geographical position criterion in respect of the user to whom each packet is addressed.

18. A device according to claim 17, further including an adaptive coding and modulation unit for coding data blocks and grouping coded bits into modulation symbols as a function of said required protection level.

19. A device according to claim 17, further including an input for receiving information representing transmission channel conditions for each user.

20. A device according to claim 19, wherein said input is connected to a backward channel over which each user sends said information representing transmission channel conditions.

21. A device according to claim 19, further including means for determining the level of protection required for sending each packet on the basis of said information representing transmission channel conditions.

22. A device according to claim 19, further including means for modifying said geographical criterion on the basis of said information representing transmission channel conditions.

23. A device according to claim 17, further including means for modifying the scheduling algorithm of the second scheduler according to a signal representing the state of occupancy of the buffers.

24. A device according to claim 17, further including means for preventing, according to a signal representing the state of occupancy of the buffers, the extraction of a leading packet from one of said queues on behalf of the first scheduler if the buffer to which said packet is addressed does not have sufficient free capacity to store it.

25. A device according to claim 17, further including means for controlling the speed of operation of the first scheduler and the second scheduler so that the first scheduling algorithm is executed faster than the second scheduling algorithm.

26. A device according to claim 17, wherein said common transmission channel is a satellite transmission beam.

* * * * *